(12) United States Patent
Giuliano et al.

(10) Patent No.: US 12,197,407 B1
(45) Date of Patent: Jan. 14, 2025

(54) METRIC DATA PROCESSING AND STORAGE

(71) Applicant: Amazon Technologies, Inc., Seattle, WA (US)

(72) Inventors: Andrea Giuliano, Dublin (IE); Gary Taylor, Dublin (IE); Gavin Bramhill, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/548,427

(22) Filed: Dec. 10, 2021

Related U.S. Application Data

(60) Provisional application No. 63/283,400, filed on Nov. 26, 2021.

(51) Int. Cl.
*G06F 16/22* (2019.01)

(52) U.S. Cl.
CPC .................................. *G06F 16/22* (2019.01)

(58) Field of Classification Search
CPC ....................................................... G06F 16/22
USPC ....................................................... 707/822
See application file for complete search history.

(56) References Cited

U.S. PATENT DOCUMENTS

| | | | |
|---|---|---|---|
| 6,052,694 A | 4/2000 | Bromberg | |
| 6,269,401 B1 | 7/2001 | Fletcher et al. | |
| 6,321,264 B1 | 11/2001 | Fletcher et al. | |
| 6,363,477 B1 | 3/2002 | Fletcher et al. | |
| 6,763,357 B1 | 7/2004 | Deshpande et al. | |
| 7,577,736 B1 | 8/2009 | Ovenden | |
| 7,640,258 B2 | 12/2009 | Garcea et al. | |
| 7,769,792 B1 | 8/2010 | Burrows et al. | |
| 8,738,645 B1 | 5/2014 | Bacthavachalu et al. | |
| 8,752,015 B2 | 6/2014 | Basak et al. | |
| 9,081,829 B2 | 7/2015 | Bhave et al. | |
| 9,471,610 B1 | 10/2016 | Long et al. | |
| 9,697,316 B1 | 7/2017 | Taylor et al. | |
| 9,742,435 B1* | 8/2017 | Poghosyan | H03M 7/3082 |
| 10,374,915 B1* | 8/2019 | Zhi | H04L 43/0876 |
| 10,749,766 B1 | 8/2020 | O'Shea | |
| 11,055,300 B2* | 7/2021 | Zhang | H04L 67/02 |
| 11,341,150 B1 | 5/2022 | Ganesan et al. | |
| 2003/0115508 A1 | 6/2003 | Ali et al. | |
| 2004/0133395 A1 | 7/2004 | Ding et al. | |
| 2004/0133573 A1 | 7/2004 | Miloushev et al. | |
| 2005/0010572 A1 | 1/2005 | Clark et al. | |
| 2005/0154838 A1 | 7/2005 | DeWitt et al. | |

(Continued)

FOREIGN PATENT DOCUMENTS

CN 105204971 A 12/2015

*Primary Examiner* — Hosain T Alam
*Assistant Examiner* — Saba Ahmed
(74) *Attorney, Agent, or Firm* — Davis Wright Tremaine LLP

(57) ABSTRACT

Described technologies generate a data structure corresponding to values sequenced based on a plurality of timestamps associated with the values. The data structure can include a first section identifying a first timestamp associated with the plurality of timestamps and a number representing how many timestamps are associated with the plurality of timestamps, and a second section including at least a value linked to the first timestamp, and an additional value representing an encoding type associated with the second section. The data structure can be stored in computer-implemented storage.

19 Claims, 32 Drawing Sheets

(56) References Cited

U.S. PATENT DOCUMENTS

| | | |
|---|---|---|
| 2005/0155026 A1 | 7/2005 | DeWitt et al. |
| 2006/0294439 A1 | 12/2006 | Rolia et al. |
| 2007/0276843 A1 | 11/2007 | Lillibridge et al. |
| 2008/0114753 A1 | 5/2008 | Tal-Ezer |
| 2010/0145978 A1 | 6/2010 | Anashkin et al. |
| 2010/0217771 A1 | 8/2010 | Nash |
| 2010/0257099 A1 | 10/2010 | Bonalle et al. |
| 2010/0306222 A1 | 12/2010 | Freedman et al. |
| 2011/0219270 A1 | 9/2011 | Bouda |
| 2011/0238687 A1 | 9/2011 | Karpuram et al. |
| 2011/0271144 A1* | 11/2011 | James ............... G06F 11/1441 711/135 |
| 2012/0054158 A1 | 3/2012 | Hu et al. |
| 2012/0072258 A1 | 3/2012 | Hull et al. |
| 2012/0204193 A1 | 8/2012 | Nethercutt |
| 2012/0233199 A1 | 9/2012 | Jenkins |
| 2012/0290718 A1 | 11/2012 | Nethercutt |
| 2013/0091105 A1 | 4/2013 | Bhave et al. |
| 2013/0282330 A1* | 10/2013 | Przestrzelski ............ G06F 17/10 702/176 |
| 2014/0101201 A1* | 4/2014 | Yan ....................... G06F 16/283 707/E17.014 |
| 2015/0161211 A1 | 6/2015 | Patel et al. |
| 2016/0173321 A1 | 6/2016 | Gukal et al. |
| 2016/0217073 A1 | 7/2016 | Deenadhayalan et al. |
| 2016/0231928 A1 | 8/2016 | Lewis et al. |
| 2016/0378635 A1 | 12/2016 | Taylor et al. |
| 2017/0084062 A1 | 3/2017 | Guo et al. |
| 2017/0371872 A1* | 12/2017 | McBride ................. G06F 3/067 |
| 2018/0034824 A1* | 2/2018 | Maycotte .............. H04L 63/102 |
| 2019/0138419 A1* | 5/2019 | Poghosyan ......... G06F 11/3006 |
| 2019/0138420 A1* | 5/2019 | Harutyunyan ........ G06F 11/301 |
| 2019/0163678 A1* | 5/2019 | Bath ....................... H04L 67/02 |
| 2019/0236149 A1* | 8/2019 | Kuruvada ........... G06F 16/2255 |
| 2021/0117232 A1* | 4/2021 | Sriharsha ............ G06F 16/1734 |
| 2021/0173811 A1 | 6/2021 | Agrawal et al. |

\* cited by examiner

METRIC DATA PROCESSING AND STORAGE

CROSS-REFERENCE TO RELATED APPLICATIONS

This application claims the benefit of U.S. Provisional Patent Application No. 63/283,400, filed Nov. 26, 2021, entitled "METRIC DATA PROCESSING AND STORAGE," the disclosure of which is herein incorporated by reference in its entirety. This application also incorporates by reference for all purposes the full disclosure of co-pending U.S. patent application Ser. No. 17/548,417, filed Dec. 10, 2021, entitled "METRIC DATA PROCESSING AND STORAGE", U.S. patent application Ser. No. 17/548,420, filed Dec. 10, 2021, entitled "METRIC DATA PROCESSING AND STORAGE", and co-pending U.S. patent application Ser. No. 17/548,423, filed Dec. 10, 2021, entitled "METRIC DATA PROCESSING AND STORAGE".

BACKGROUND

The technical field of collecting, storing, and processing metric data has become of enormous interest to many organizations and become a cornerstone in the optimization of new and future products/technology. The growing need for quick retrieval of metrics has become an integral practice for many organizations. Organizations now seek to use metrics to provide insight on a variety of issues, such as optimizing aspects of their products, speed, customer experience, etc. Although the high-level view of the processes involving the retrieval, collection, storage, and processing of metric data may seem trivial, implementing a robust, fast, and efficient metric data datastore is tremendously complex.

Some organizations are implementing metadata storage solutions either externally, such as through cloud storage in which the metadata is stored in logical pools, or internally, for example, embedded metadata in which the metadata is contained in the same file or structure as the original data. Due to the metadata storage methods, metric formats, etc., there are limits to many of these implementations, for example, an inability to update time-span limit on search queries, the cost of operation, and the speed of query response. However, even the most skilled in the art have difficulty in developing reliable architecture to optimize the issues created by metadata retrieval, collection, and storage.

An SQL based query engine provides customers with the ability to efficiently segment, aggregate, and compare their metrics, which may be stored within a metrics repository, at scale. An SQL based query engine may ameliorate these limitations through core changes in current metrics repository architecture and improvements on how data and metadata are transported, processed, and stored across services. Furthermore, these optimizations are made through the utilization of many varieties, including but not limited to, the implementation of metadata binary index format, a serialization format, a dynamic caching of evolving blocks for time series metadata, and a real-time search. The use of metadata storage solutions to quickly query metric data is becoming increasingly preferred by organizations due to the explosion in the size and number of metric data being maintained by those entities. However, answering queries and associated processes quickly and easily from stored metric data can be a difficult and time-consuming process that involves significant computing resources.

BRIEF DESCRIPTION OF THE DRAWINGS

Various techniques will be described with reference to the drawings, in which.

DETAILED DESCRIPTION

The disclosure describes methods, apparatuses, and systems for implementing optimization for a SQL based query engine. In some examples, a SQL based query engine includes various subsystems. In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
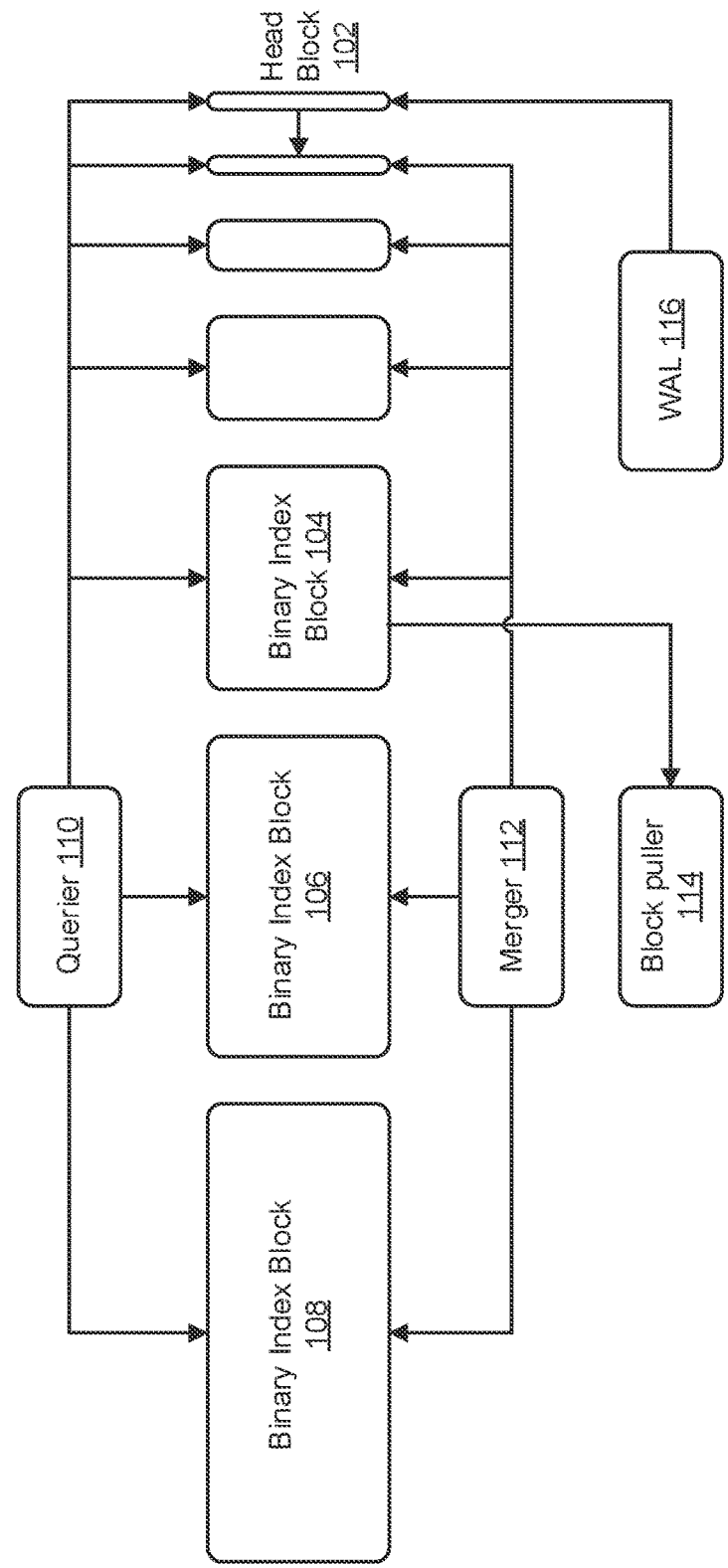
FIG. 1 illustrates an example of architecture and systems that provide the datastore functionalities for a hot metadata store, according to at least one embodiment.

FIG. 1 illustrates an example of a datastore's architecture system 100 that can provide the datastore functionalities, according to at least one embodiment. Specifically, datastore's architecture system 100 may be hot metadata storage used for ingestion of the hot metadata. The hot metadata storage may be the component in charge of handling ingestion and answering queries for the hot metadata. The hot metadata storage may process a stream of metadata and compact it into a compressed index format as the metadata gets ingested. The hot metadata storage may be a near real-time search. The datastore's architecture system 100 may allow the datastore read and write path to be decoupled. For example, the block storage service may be accessed from two processes, one that may write to it on data ingestion and the another that may serve the read/query path. The datastore's architecture system 100 may ensure elastic static stability. FIG. 1 may be representative of the time range of each block through each block's width (e.g., from right to left may be represent the age). The example datastore's architecture system 100 can include a head block 102.

The head block 102, while receiving new incoming metadata, may buffer the metadata. Following this, the head block 102 may flush the metadata into small indices (e.g., segments). The metadata that is being buffered in the head block 102 may not be searchable. Flushing the segments to file system cache may happen frequently in order to make metadata discoverable more quickly. In some embodiments, frequently may refer to being at the order seconds, for example 1-2 seconds. It is contemplated, however, that the frequency of the file system cache may not always be in the order of seconds.

Additionally, the head block 102 may collect metric names from the WAL (write-ahead log), such as the WAL 116, and periodically snapshot (e.g., write) these metric names into a new binary index block, such as binary index block 106 discussed in the document herein. Metric names can identify functions that are executable to accumulate metric data associated with the computer-implemented system. For example, metric names can be associated with metrics including CPU utilization, disk read operations, disk write operations, status check for computer implemented systems, and so forth. The metadata in the head block may not be durable. That is to say, the metadata stored may not be able to be stored in the head block for longer than a threshold of time. The threshold may be a set time duration, or may be able to be changed over time, in some embodiments. The threshold may be determined manually (e.g., set as a distinct magnitude within the code), through an algorithm, or through a machine learning algorithm.

The head block 102 may be flushed as an index and is memory mapped, and the metadata it contains may become searchable. In memory buffer, the buffer may be optimized such that it is as close as possible to the final index format to make the index creation faster. It is contemplated, however, that the optimization can be done in other suitable manners in order to make the index creation fast.

The WAL 116 may be a write-ahead log (referred to as WAL) that may transmit names to the head block 102. Further, the WAL 106 may be used to register incoming transactions to recover the state from crashes.

The block puller 114 may transmit immutable indices to the long-term storage. In some examples, "immutable" refers to an object with a fixed structure the properties for which cannot be changed.

The merger 112 may merge binary indexes to a new block spanning a longer time duration. The binary index blocks may be merged until some threshold. The threshold may be some maximum duration, such as one hour. Once the blocks are merged the original, smaller blocks may be discarded.

The merger may be a part of a hot metastore. The merger may monitor the file system. The merger may search into blocks. The merger may identify, based on a naming convention such as that shown in FIG. 19, consecutive blocks to be merged. The merger may create the new binary index format (BIF) block in the file system. The merger may name the newest merged block after the most recent time period block. The newest merged block may be larger with respect to time retention but overall smaller with respect to memory than the separate, non-merged blocks. The separate, non-merged blocks may have the same retention (e.g., of the same time range). For example, a block that is eight seconds worth of data may not be allowed to merge with another block that is 16 seconds worth of data, in some embodiments. The blocks may be immutable, that is they cannot be modified. However, the blocks may be able to be deleted off of memory. The blocks may be able to be read and created. The blocks may be merged because the merged block may store less pointers in memory (e.g., less memory mapping).

The merged block may exist at the same point in time as separate blocks used to generate the merged block. The datastore may detect the merged block and separate blocks. The datastore may be able to discard the pointers for the separate blocks and point instead to the new merged block, and this will remove the separate blocks from the memory mapping. This process, in turn, may save memory because the datastore is able to point to a single block rather than the separate blocks it was pointing to before the merging. The datastore may keep the separate blocks for a defined time period in order to respond to a query request during the defined time period. The iterative process of merging may continue until a configurable limit is reached. The limit may be time defined, size defined, or any other manner of determining a threshold to which the merged block is being limited.

The querier 110 may transmit the query request to the datastore host. The host of the datastore may contain all the metrics with the same name for the same AccountID. The AccountID can be associated with an account of a user or entity of an online service provide, in at least one embodiment. However, the AccountID can also comprise a different type of identifier, such as an identifier linked to one or more computer-implemented resource, instances, and the like. The querier 110 may identify one or more binary index blocks, such as the binary index block 106 it may need to perform the query against. The querier 110 may find metrics and place them in groups specified in a query. Additionally, the querier may perform the low-level integration to the metadata datastores such as federation on the boundaries for hot and cold metadata, caching, and blocks merging. Further, the querier may consolidate the results from the one or more binary index blocks in order to handle duplication.

The querier 110 may be able to make use of a bloom filter. In some embodiments, a bloom filter may refer to a filter which searches only in blocks that can possibly contain the data requested. Additionally, the bloom filter may also serve as a metadata pointer to the appropriate binary index block.

The binary index block 106 may contain immutable compact binary indexes optimized for queries. Due to the immutability of each queried index, the datastore's architecture system 100 may have more scope for caching extensive query requests. The datastore keeps enough binary index blocks to cover, for example, 3-4 hours' worth of hot metrics, although other time periods may be configured depending on the specifics of the implementation. Furthermore, the time period can be configurable by a developer or a user of a computer-implemented system associated with the data store. Further, the binary index block 106 may be durable in some manner, for example the binary index block 106 may be flushed or synced depending on the age of the data (e.g., how long the data has been in the datastore).

Figure 2:
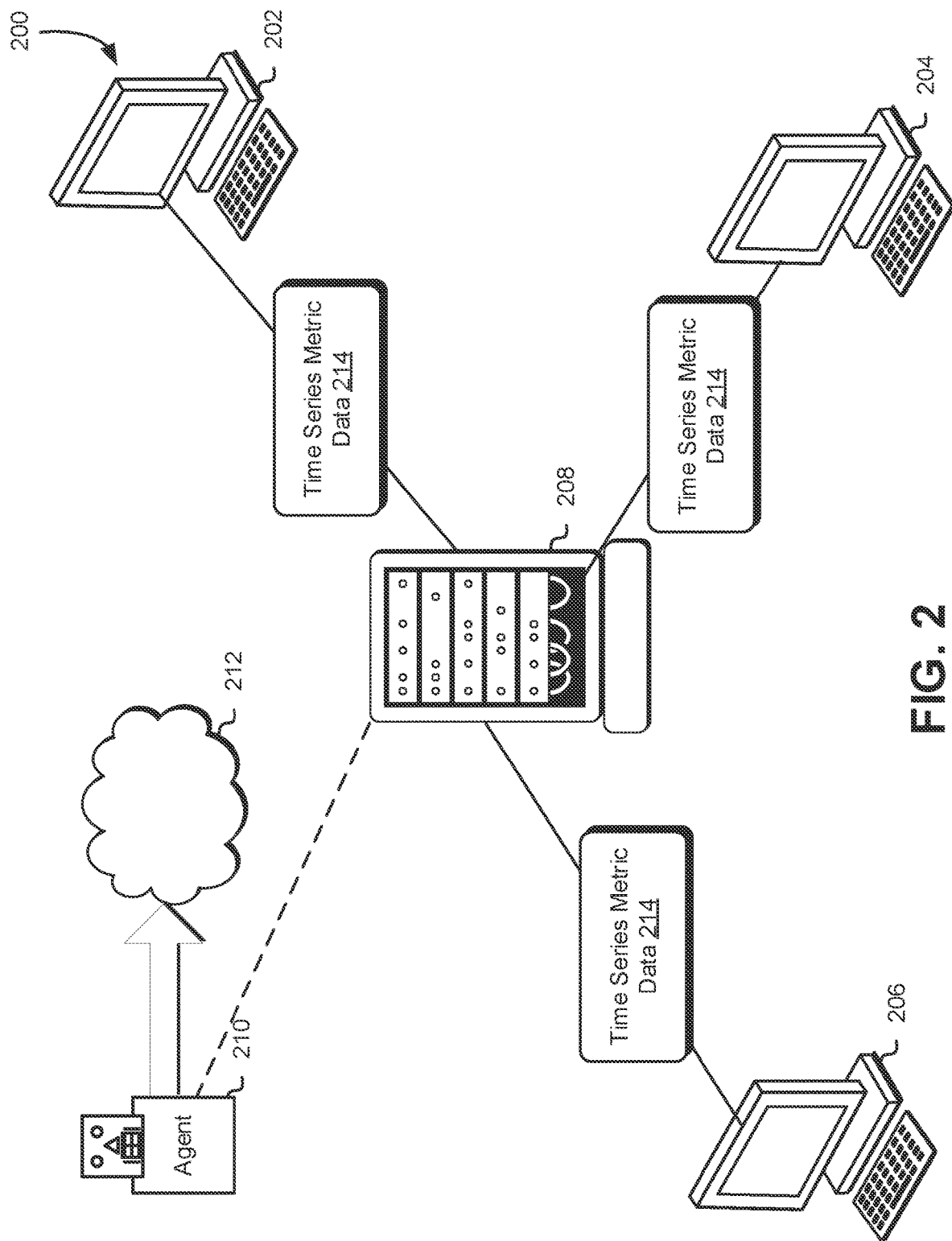
FIG. 2 illustrates an example of an agent monitoring a distributed system for purpose of serializing collected metadata, according to at least one embodiment.

FIG. 2 illustrates an example of a system 200 in which an agent is monitoring a distributed system for purpose of efficiently serializing the collected metadata.

The entity 202 may be a system which is uploading metadata to an external computing resource 208. The system may be a computer-implemented system, such as a server, a collection of one or more entities, or any other suitable device that may upload data to an external computing resource 208. The entity 202 can comprise various computational resources, including virtual computer instances, applications, services, processes, web servers, computer storage, database instances, networking components, and so on. The entity 202 may also be a data lake. In some embodiments, the entity 202 can be hosted in the cloud by an online service provider.

The entity 202 can comprise hosted multi-tenant provider networks. The entity 202 can be associated with a number of networks, such as the Internet and/or one or more private networks. Clients, such as client computing devices or other interfaces, can use the network to interface with the entity 202. Clients can include entities or individuals that contract with an operator associated with the entity 202 to obtain computational services provided by the operator of the entity 202. In some embodiments, the client can be resource owners, resource developers, compliance managers, other users or entities, and so on.

Entities 204 and/or 206 may be similar to entity 202. Entities 202, 204, and 206 may be distributed across different geographical locations. The entities may not have any relation to one another, besides having the ability to be connected to the external computing resource 208.

External computing resource 208 may collect, host, and generate the time series metric data 214 from entity 202, 204, and/or 206. The time series metric data 214 can be hosted by computer-implemented storage associated with entity 202, 204, and/or 206. Additionally, or alternatively, this computer-implemented storage can be provided by an online service provider (e.g., operator) that provides the entity 202, such as the external computing resource 208. In some embodiments, one or more of the computer-implemented storages hosting the time series metric data 214 can be external of the entity 202, such as external computing resource 208. For example, a customer, such as a customer associated with an external computing resource, such as external computing resource 208, can provide computer-implemented storage to host the time series metric data 214. The external computing resource 208 can be a standalone computing device, a collection of computing devices, a computer-implemented system associated with an organization, and so forth. The external computing resource 208 may be a datastore which is monitored by a monitoring agent 210.

In at least one embodiment, the time series metric data 214 comprises time series data and associated value(s) accumulated for a customer, such as a customer associated with the external computing resource 208. This time series data and associated value(s) can comprise, but is not limited to, data that describe values of the system's functionalities and resource usage during a particular time series. For example, the time series metric data 214 may comprise how much CPU was consumed over a certain amount of time, or at a particular instance in time, for a particular entity. Further, the time series metric data 214, including time series data and associated value(s), can be historical data linked to variability, latency, AccountID, metric name, and so forth. Other types of data can be included in the time series metric data 214. Other types of data can include information about the data (i.e., metadata). The time series data and associated value(s) may be stored in two distinct arrays. One of the arrays can be for the timestamp, and the other array can be for the value that corresponds with the timestamp. The time series array can be always increasing in value. This time series metric data 214 may be exploited for optimization. The time series metric data 214 may be accumulated by the external computing resource 208 and further formatted by the monitoring agent 210. The monitoring agent 210 may optimize the time series metric data 214 by optimizing the time series storage rather than the value(s) associated. Further discussion of the particulars of the formatted time series metric data 212 of the accumulated data can be found in FIG. 3.

The monitoring agent 210 may be a module, such as a module realized through executing computer-executable instructions, to one or more systems designed to generate metrics data associated with those one or more resources, such as through external computing resource 208 or entities 202, 204, and 206. The monitoring agent 210 may be an entity which formats (e.g., serializes) and processes the time series metric data 214 collected from the external computing resource 208. The monitoring agent 210 can format and process the time series metric data 214 collected from the external computing resource 208 at least using the described systems and methods incorporating the one or more data structures described herein. The monitoring agent 210 may increase throughput such that aggregation of time series metric data 214 may be done at near real time. Similarly, the monitoring agent 210 can increase throughput such that aggregation of time series metric data 214 is accomplished at least using the described systems and methods incorporating the one or more data structures described herein. The monitoring agent 210 may be able to serialize the data received from external computing resource 208 at near real-time. A serialization of the data received from external resource 208 is facilitated through the one or more data structures described herein, in accordance with at least one embodiment.

The monitoring agent 210 can be used to serialize data received from the external computing resource 208 and format it into formatted time series metric data 212. The monitoring agent 210 may take the data stored in memory from the external computing resource 208 and format it into the formatted time series metric data 212. The formatted time series metric data 212 may be a serialization format. This formatted time series metric data 212 can be generated and stored for customers of the external computing resource 208, such as the customer associated with the entity 202, 204, and/or 206. The formatted time series metric data 212 can be stored in a server-implemented storage of the server 202. In at least one embodiment, the formatted time series metric data 212 can be stored in data buckets. A data bucket can be a cloud storage resource offered by the online service provider that provides the computer-implemented system 102. Data buckets are similar to file folders that store objects, which can include data and descriptive metadata of the data.

Figure 3:
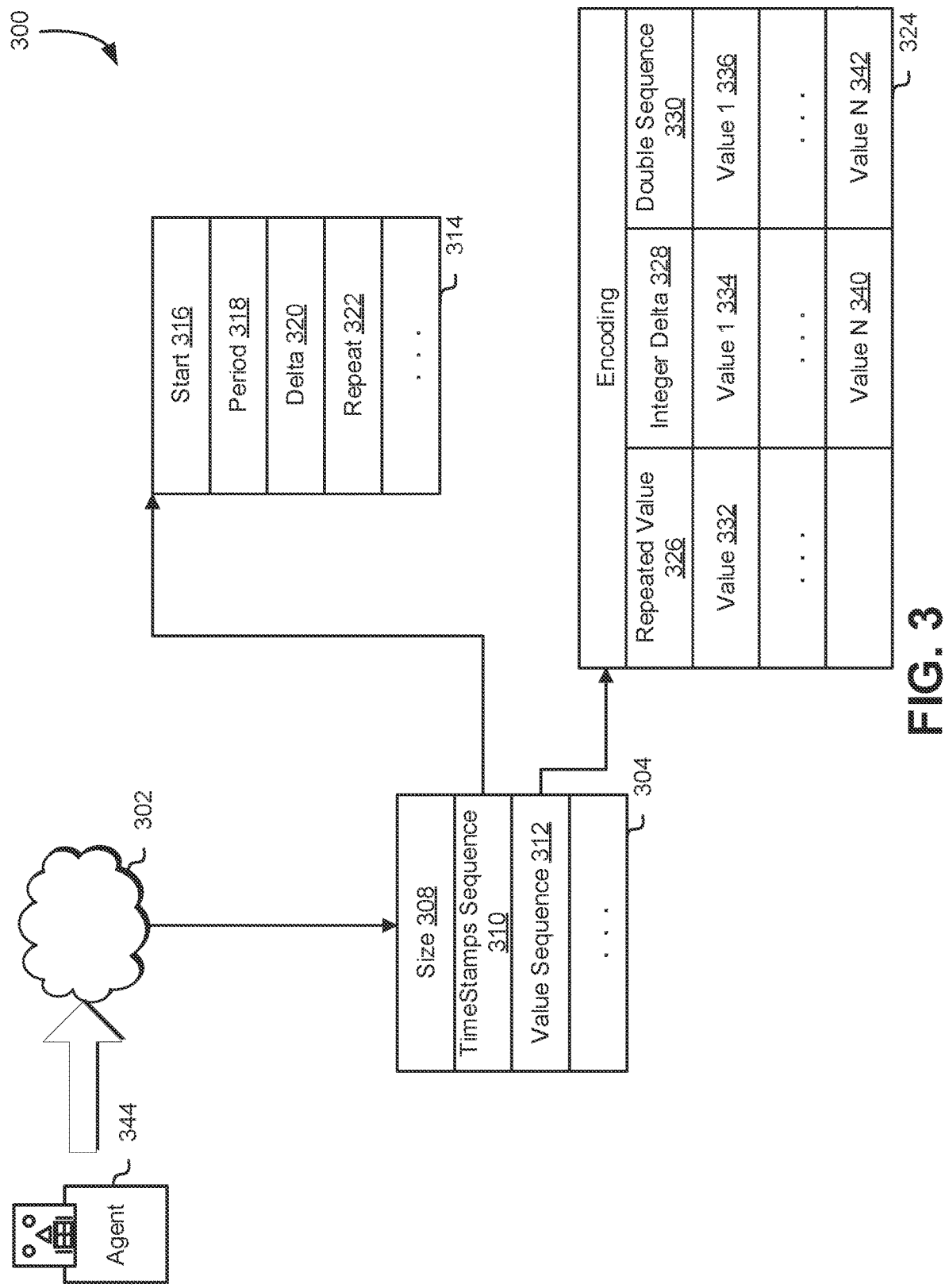
FIG. 3 illustrates an example of the architecture depicting how a monitoring agent serializes collected metadata, according to at least one embodiment.

FIG. 3 illustrates an example of the serialization format architecture 300 depicting how a monitoring agent 344 serializes data in accordance with an embodiment. This serialization format architecture 300 may optimize time series read time and compression for transport. This serialization format may be optimized to leverage the fact that many metrics stored in metrics repository are single valued (e.g., they are at a steady-state, unchanging value over an extended time range) and so they do not require much data to be represented. In order to be better optimized for typical query processing, a time series of distributions could be stored in the serialization format architecture 300. The serialization format can store multiple time series as a sequence of timestamps and values.

The serialization format 302 can be broken down into distinct arrays including, but not limited to, array 304, array 314, and array 324. The serialization format 302 may be similar to the formatted time series metric data 212 as discussed in FIG. 2. The serialization format can store multiple time series as a sequence of timestamps and values. For example, the metric data is displayed in the serialization format as the array 304. The metric data may be any metric data collected from a server or computer-implemented storages (post-ingestion) by the monitoring agent 344 as discussed in FIG. 2 above. The array 304, and at least one embodiment, is an index to the additional data structures referred to in the array 304 and associated with the serialization format 302.

The array 304 may include a size 308 of the time sequence, which may be represented in 4 bytes in some instances, that is to say, the number of time sequence data points during the collection time of the monitoring system 334. The array 304 may include a time stamps sequence 310 which can represent the timestamps that this index contains. The array may include a values sequence 312 which can represent the time series values stored within this index. It is contemplated, however, that, in some embodiments, this order of the array 304 may vary. Further, it is contemplated that the amount of representative bytes may vary and/or may be configurable.

The sequence of timestamps array 314 may contain timestamp data including, but not limited to the start 316, the period 318, the delta 320, and the repeat 322. The start 316 can identify the first timestamp(s) in the sequence. The period 318 may identify the time series resolution, for example, 60 for 1 minute metrics were the resolution is in seconds. The period 318 may be indicative of how often sampling occurs in a sequence of timestamps. The delta 320 can represent the difference between timestamps contained in the sequence. The delta 320 may be used as the increment or decrement value of the timestamp. That is to say, the delta 320 may not be a standalone value (e.g., it is not a time value, for example, 3 seconds). Rather, the value of position N is dependent on the value N−1 (e.g., the position previous). For example, a start 316 is given as 1 second (e.g., Position 1) and the next index (e.g., the next time value, Position 2) is sampled at 5 seconds. Rather than the sequence of timestamps array store the value 5, it will store the delta value relative to the start, in this case the delta will be 4 (because of the subtraction of 1 from 5). Expanding on this example, if the next index (Position 3) is sampled at 10 seconds, the sequence of timestamps array will store the delta value relative to the previous value (Position 2), in this case 6 (because of the subtraction of 4 from 10). In turn, this may save memory and make for faster querying times due to the more efficient formatting, especially given larger ranges of times.

The repeat 322 may identify the number of occurrences stored in the sequence. The start 316, period 318, delta 320, and repeat 322 may be represented in 4 bytes. It is contemplated, however, that the amount of representative bytes may vary in some embodiments. It is contemplated, that in some embodiments, this order of the array 304 may vary.

The values sequence 324 may contain the sequence of values. The values sequence 324 may have three scenarios under which to store the data. One scenario may be where the values sequence 324 may store a repeated value sequence, such as repeated value 326. Another scenario may be where the values sequence 324 may store an integer delta sequence, such as integer delta 328. The last scenario may be where the values sequence 324 may store a double sequence, such as double sequence 330. These scenarios may be determined by the monitoring agent 334, by determining the value types (e.g., all whole number values, all one steady-state number values, or mixed or otherwise double number values) as collected from the metric data, such as the time series metric data 214 in FIG. 2. An encoding byte may be stored together with the sequence to further optimize different scenarios.

The repeated value 326 can represent a value (an integer or a double) that is the same for the entire sequence, which may be stored in, for instance, 1 byte. A 1-byte representation may act as a flag to indicate that there is a repeated value. The value 332 may be an example of a repeated value in sequence. This value may not change because it is defined as a repeated value, therefore, it is the only value in the sequence if the array 304 is a repeated value case. The value 332 may be represented in 4 or 8 bytes, for example. The byte value may be determined based on the value (whether an integer or a double) of the repeated value. Continuing with the 4 or 8 byte example, the serialization format 302 may check value 332 to see if it can be represented in 4 bytes, and if so store the value 332 in 4 bytes. If the value 332 may not be able to be represented in 4 bytes, the value 332 may be stored in 8 bytes. The value 332 may be not be able to be represented in 4 bytes for various reasons, for example the value 332 being cast as a double. This may allow for saving an extra 4 bytes if the number is whole, or an integer. Further, it is contemplated that the amounts of the representative bytes may vary and/or may be configurable.

The integer delta 328 may act as a flag to indicate that the sequence is represented as a sequence of deltas which are integers, stored in 1 byte. Other byte values may be used and/or the byte value can be configurable. Further, the integer delta 328 may represent the difference between the sequence of values when this is an integer number. The case where it is an integer delta representation, the array may always be increasing or always decreasing. An integer is a data type used to define numeric values in a computer system that are whole numbers, and it may need less memory storage space than a double, for example. The value 1 334 may be an example of the starting integer delta in a sequence. The value 1 334 can store the true value of integer (e.g., this value is not a delta value). The integers following the sequence can be represented as deltas. These deltas may correspond to the given period, such as period 318.

The value N 340 may be an example of the last integer delta in a sequence. The use of the delta in the integer delta sequence may be similar to the use of the delta values as described in delta 320 above. The use of the delta in the integer delta sequence may be to reduce memory storage and make querying faster. All values can be represented in 4 bytes in the integer delta sequence 328. Other byte values can be used and/or the byte value can be configurable.

The double sequence 330 may represent the sequence of values stored as a double. A double is a data type used to define numeric values in a computer system that contain decimal points, and it may need more memory to be stored than an integer. As mentioned above, 1-byte representation may be utilized to act as a flag to indicate that the sequence is represented as a sequence of doubles. The value 1 336 may be an example of the starting double value in a sequence. The value N 342 may be an example of the last double value in a sequence. All values can be represented in 8 bytes in the double sequence 330. Other byte values can be used and/or the byte value can be configurable.

Figure 4:
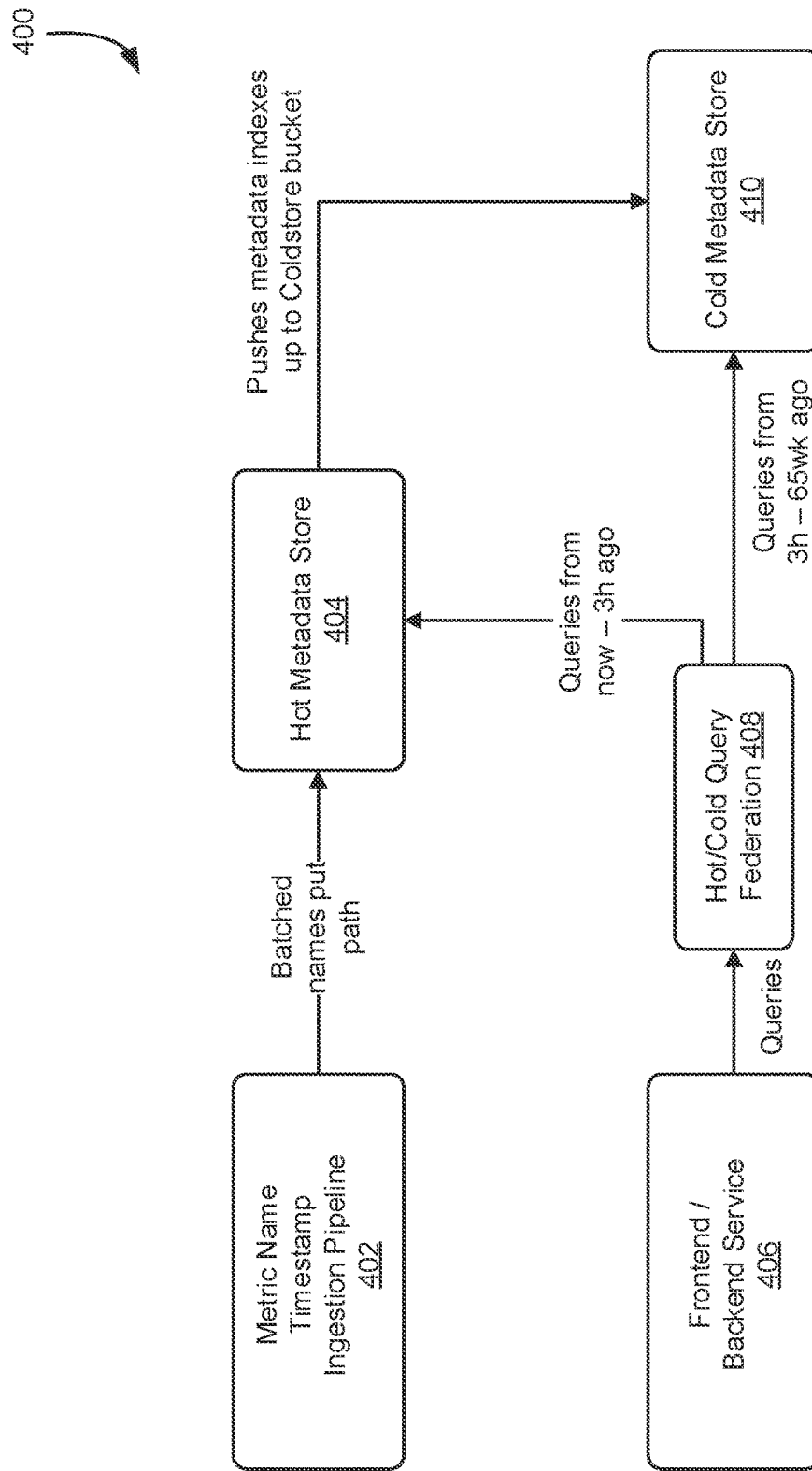
FIG. 4 illustrates an example of architecture depicting how hot and cold datastores may be implemented into an infrastructure which collects and tracks metadata, according to at least one embodiment.

FIG. 4 illustrates an example of a system architecture 400 depicting how hot and cold datastores may be implemented into an infrastructure which collects and tracks metadata, according to at least one embodiment. The system 400 may also be referred to as the infrastructure which collects and tracks metadata. The system 400 may include, but is not limited to, a metric name timestamp ingestion pipeline 402, a hot metadata store 404, a frontend/backend service 406, a hot/cold query federation 408, and a cold metadata store 410.

The hot metadata store 404 may be an AZ-redundant local datastore spread across multiple cells. The hot metadata store may also be referred to as hot metastore, metastore, and datastore in this disclosure. An AZ-redundant local datastore is an availability zone in which there is a replica of the data collected. In some embodiments, the AZ-redundant local datastores may be independent. The metastore may ingest the optimized binary format. The retention period of the datastore 404 may be, for example, 3 hours. It will be appreciated that the 3 hour delineation between hot and cold metadata is merely selected for illustrative purposes and should not be viewed as limiting in nature. Furthermore, the 3 hour delineation between hot and cold metadata can be configured by a system developer or other user of a computer-implemented system associated with the one or more datastores. Although this example is continued throughout, other time periods may be selected depending on the specifics of the implementation without departing from the scope of this disclosure. The hot metadata store may perform a near-real-time search. To perform a near-real-time search, the hot metastore may collect metadata in memory and then periodically write a small binary block containing the last few seconds of metadata to disk. As soon as the block is written, the block may be used to answer search queries, along with previously written blocks. Together all these blocks may cover a larger range of time, e.g., several hours, in hot store range, after which they may be discarded. The blocks may also be merged together so that fewer blocks need to be queried.

The hot metadata store 404 may comprise multiple cells replicated across independent AZ-redundant stacks for availability and durability. The hot metadata store 404 may be responsible for handling queries for metric metadata published within the last three hours, or some other time duration that is either predetermined or configurable. The hot metadata store 404 may ingest names from the metric name timestamp ingestion pipeline 402 which it rolls up into metric metadata indexes that are eventually pushed to the cold metadata store 410. The metadata indexes can be stored in computer-implemented storage. Each time a new name is ingested into the hot metadata store 404, the name may be stored in memory. Each time a new name is ingested into an infrastructure which collects and tracks metadata (e.g., the system 400), the metric names and associated timestamps may be sent to the metric name timestamp ingestion pipeline 402. The metadata store may ingest all names over a configurable period of time, for example 8 seconds. The configurable period of time may be configured. Before the configurable period of time is finished, the metrics associated with the ingested metadata may not yet be discoverable. After the configurable period of time, there may be enough metadata to serialize the metadata in the BIF on disk as discussed in FIG. 7. The datastore may be able to ingest and merge other blocks parallel to other processes performed in a system.

The frontend/backend service 406 may be comprised of a backend service and provide an interface to the backend service via the querier (e.g., the querier may be the frontend service). The backend service may be a service that parses the query language to distinguish between the three stages (metric discovery, metrics data retrieval, and time series processing) and distribute the work across the components it integrates with. The querier may be similar to the querier 110 as described in FIG. 1. The querier may perform the low-level integration to the metadata datastores such as the hot/cold federation 408 on the boundaries for hot and cold metadata.

The cold metadata store 410 may be a regional object-based datastore, or other archival datastore, which handles requests for metric metadata published from three hours to 65 weeks ago, as depicted in this example. It will be appreciated that the depicted ranges of time are merely for illustration and should not be viewed as limiting in nature. It may also merge together metadata indexes into larger chunks to make it more efficient to query large time ranges in the past.

Figure 7:
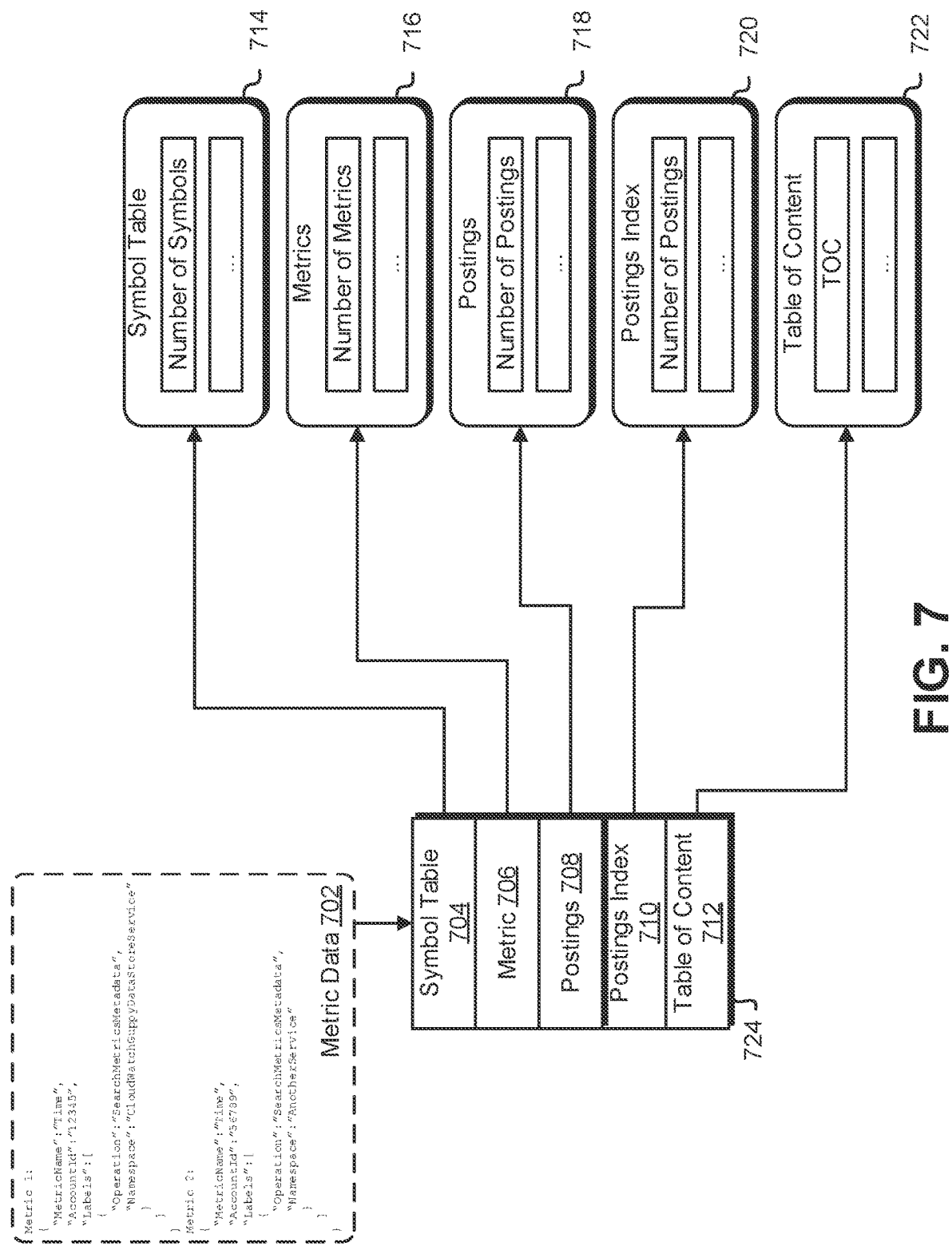
FIG. 7 illustrates an example of the data structure for metadata storage in the binary index format (BIF), according to at least one embodiment.

The metadata may only be able to be queried after it has been written to disk in an optimized binary format, such as the format described in FIG. 7. The system may be notified such that the ingested BIF block is memory mapped, to optimize the system. The configurable period of time block may be memory mapped in the ingested format of BIF. The format BIF may consist of only pointers. The file system may be used for caching the data.

Figure 5:
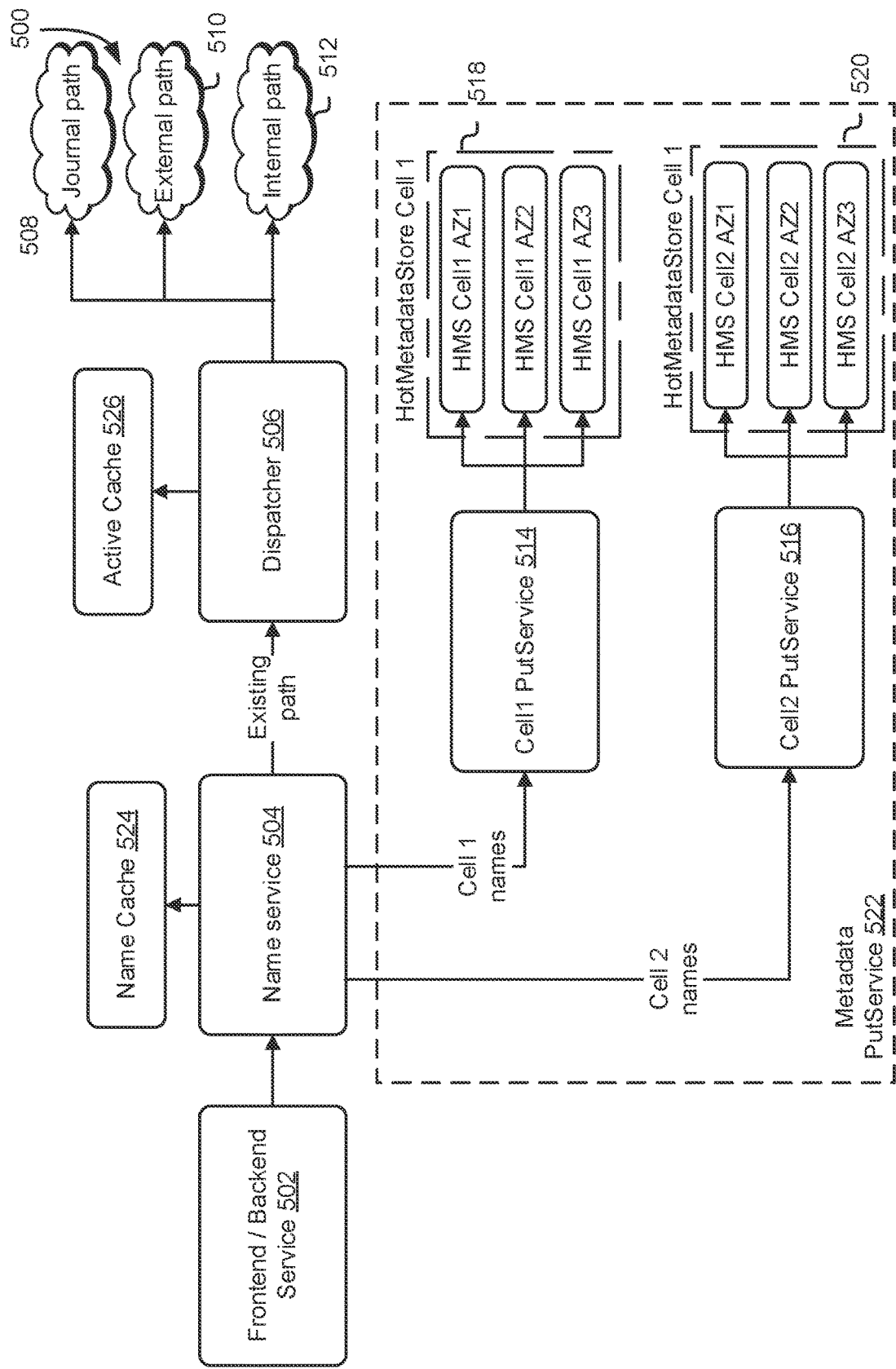
FIG. 5 illustrates an example of architecture depicting how hot metadata stores may be ingested and implemented into an infrastructure which collects and tracks metadata, according to at least one embodiment.

FIG. 5 illustrates an example of a system architecture 500 depicting how hot metadata stores may be ingested and implemented into an infrastructure which collects and tracks metadata according to at least one embodiment. The system 500 may comprise, but is not limited to, a frontend/backend 502, a name service 504, a name cache 524, a dispatcher 506, an active cache 526, a journal path 508, an external path 510, an internal path 512, a Metadata PutService 522, a Cell1 PutService 514, a Cell2 PutService 516, a Hot Metadata Store Cell1 518, and a Hot Metadata Store Cell1 520.

The frontend/backend 502 may be similar to the frontend/backend service 406, as described in FIG. 4. The name service 504 may perform 40-minute de-duping via the name cache 524. The name service 504 may handle the metric names such that they may be partitioned and batched by Metric Insights cell and dispatched to the appropriate Metadata PutService 522, such as Cell1 PutService 514 or Cell2 PutService 516. Further, the name service 504 may distribute to the name cache 524. The name service 504 may use in-memory queueing with offload to persistent storage. The dispatcher 506 may distribute to the journal path 508, the external path 510, the internal path 512, or the active cache 526. The dispatcher may be able to be replaced by PutService 522.

The Metadata PutService 522 may be a cellular service responsible for throttling and filtering external metrics, before spooling and dispatching to the three Hot Metadata Store zonal replicas within the cell, shown in Hot Metadata Store Cell1 518, and a Hot Metadata Store Cell1 520 as HMS Cell1 AZ1-3 and HMS Cell2 AZ1-3. The Hot Metadata Store Cell1 518 may be a cellular and zonally redundant data store. The Hot Metadata Store Cell1 518 may be responsible for aggregating, for example, three hours of metric metadata and serving queries across the aggregated metric metadata. In at least one embodiment, metric metadata is aggregated over some other time range, which may be configurable by developer or user. The Hot Metadata Store Cell1 518 may also be responsible for publishing aggregated metadata to an object-based datastore for the ColdMetaStore, such as the Cold Metadata Store described in FIG. 4 above. The Hot Metadata Store Cell2 510 may be similar to the Hot Metadata Store Cell1 518.

Figure 6:
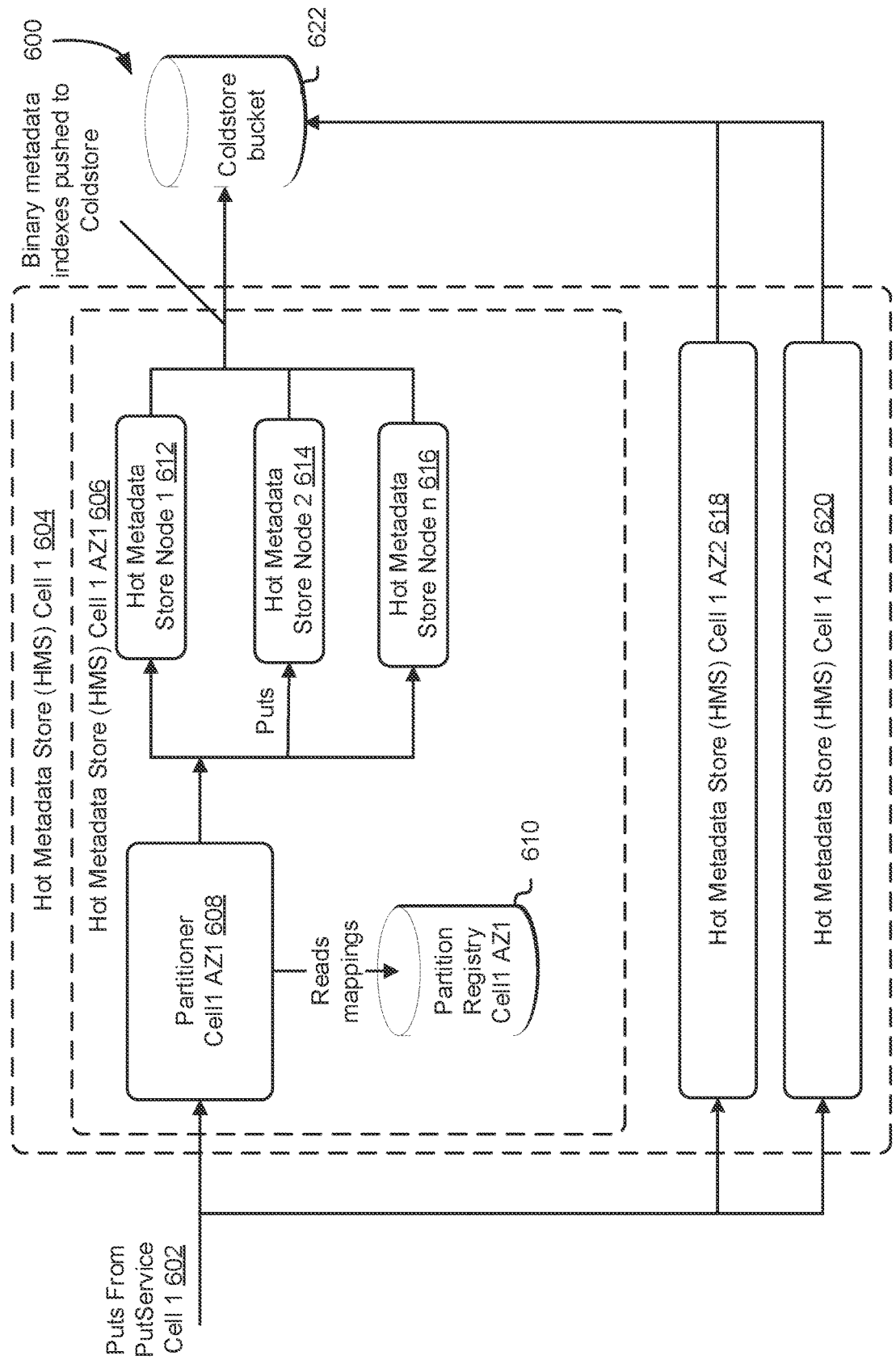
FIG. 6 illustrates an example of architecture within the hot metadata store zonal stacks, according to at least one embodiment.

FIG. 6 illustrates an example of the architecture of the Hot Metadata Store zonal stacks 600. The Hot Metadata Store zonal stacks 600 may include, but is not limited to, Puts From PutService Cell 1 92, a partitioner Cell1 AZ1 608, a partition registry cell1 AZ1 610, a Hot Metadata Store (HMS) cell 1 AZ1 606, an HMS node 612, 614, and 616, an HMS cell1 604, a HSM Cell1 AZ2 618, a HSM Cell1 AZ3 620, and a Coldstore bucket 622.

Such an architecture may be implemented for cellular routing and may cellularize a pipeline, such as the metric name timestamp ingestion pipeline 402 in FIG. 4. Cellularization may allow for higher scalability and may result in a reduced blast radius (e.g., reduced total impact of a potential problem or security event). Additionally, the internal metrics may become another cell. Cellular routing may be based on account (e.g., a client) and the partitioning strategy for metrics across hosts, which may depend on the type of cell. The hosts of the datastores may contain all the metrics with the same name for the same AccountID. Smaller cells may contain accounts with smaller numbers of metrics, for example less than 5 million metrics. The determination of which cells may be small or large may be determined by performance testing. It is contemplated that this number of metrics may vary in some embodiments. The number of cells may depend on the overall region size. Metrics in clusters may be partitioned by accounts across one or more hot metadata store nodes. Large accounts may be contained in cells and their metrics are distributed across many nodes. The largest accounts, which may own tens of billions of metrics, may be distributed across multiple cells.

Further, cellular mappings may be maintained by automated systems. The automated systems may migrate customers to different sized cells based on the number of metrics in their account. Examples of the automated systems include, but are not limited to, an algorithm, a service, and/or a machine learning model for the purpose of maintaining cellular mappings. The automated systems that migrate customers may also emit metrics to show the current cells' capacities so that new capacities can be pre-emptively built out. The automated system may identify the largest accounts and orchestrate a migration from one cell to another. Creating new cells may involve adding new stacks to an infrastructure's templates. The cells may be configured based on the results of performance testing. Historical cellular mappings may need to be performed for 65 weeks to correctly handle ColdMetaStore queries.

The Puts From PutService Cell 1 602 may act as input into the hot metadata store zonal stack 600. The partitioner Cell1 AZ1 608 may be responsible for partitioning and batching metric metadata to be sent to the correct Hot Metadata Store node, such as HMS node 612, 614, and 616. The partition may be based on AccountID and MetricID. The partitioner may be partition-aware, reading the partitioning mappings from a Partition Registry. Small accounts may be partitioned by account number, and all their metric metadata is placed locally on a single Hot Metadata Store node. This locality may minimise the number of hosts involved when executing queries. Larger accounts with hundreds of millions of metrics may be partitioned across multiple nodes by through the use of an identifier. For example, in at least one embodiment, the identifier may be a 16-byte hash based on the AccountID, metric name, and dimensions. In some embodiments, the hash can comprise other byte value amounts. This method may distribute the resource cost of large queries out over many nodes.

The partition registry cell1 AZ1 610 may be the data source used by the Partitioner to distribute metadata across multiple store nodes. Different types of cells may have different account-node cardinalities. Smaller account cells may typically map an account to only one node, whereas larger account cells can map one account across the entire set of storage nodes.

The hot metadata store (HMS) cell 1 AZ1 606 may be the HMS for cell one deployed on an availability zone 1. The HSM Cell1 AZ2 618 may be the HMS for cell one deployed on an availability zone 2. The HSM Cell1 AZ3 620 may be the HMS for cell one deployed on an availability zone 3. HSM Cell1 AZ1 606, AZ2 618, and AZ3 620 may contain the same data for the same customer. That is to say, the metadata for a customer may be replicated three times on three different zonal data stores. The replicas, such as HSM Cell1 AZ1 606, AZ2 618, and AZ3 620 may be implemented in order to avoid any gaps in data, and is accounted for. Additionally, the replicas may minimize the amount of resource used. A querier, similar to that of FIG. 1, may search for the three replicas when responding to a query. The query may retrieve the results from at least two of the three replicas and may merge a result together to return results back to a customer. Additionally, or alternatively, the querier may assign a confidence value to each of the replicas. In turn, the querier may not need to search all the replicas if the confidence value assigned to one replica meets a threshold confidence value. It is contemplated that the number of replicas may vary in some embodiments.

The HMS node 612, 614, and 616 may aggregate ingested metric metadata in a binary index format, such as the method described in FIG. 7. The HMS node 612, 614, and 616 may support queries across the last 3 hours of data, continuing the example from FIG. 4. As described, the specified time period can be configurable by a user and/or developer. The HMS node 612, 614, and 616 may upload binary metadata indices to the ColdMetaStore, such as the coldstore bucket 622. The HMS cell1 604 may be dedicated to one customer that has metrics. Within the HMS cell1 604 you may partition against metric type.

FIG. 7 illustrates an example of the data structure 700 for the metadata storage in the binary index format (BIF). The BIF may provide a fast lookup for queries. Specifically, in at least one embodiment, the data structure 700 can provide for fast lookup of data, facilitated through a binary search, for one or more queries. In at least one embodiment, the various structures of the data structure 700, such as the symbol table, holds a sorted set of symbols for ingested metrics. This section in the index is where symbols are stored as a sequence of Unicode Transformation Format-8-bit (UTF-8) encoded bytes characters. UTF-8 is, in at least one embodiment, a variable-width character encoding used for electronic communication. Subsequent sections of the index point to symbols in the table to reduce significantly the index size and to allow the indices to be traversed using binary search. Furthermore, the symbol table can store, for example, a sequence of 4 bytes offsets of where the symbol starts and after that the series of ordered symbols. Other byte values can be used and/or the byte value can be configurable.

That allows for a fast binary search when looking for symbols. The BIF may provide better compression on the transport layer. Additionally, the BIF may minimize the amount of data that needs to be read to answer a query. The addition of the BIF may change how the data is stored (regarding its formatting), as well as how a query can find the required metric metadata. The data structure may include, but is not limited to, the formatted metric metadata 724, the metric data 702, a symbol table 704, a metric section 706, a postings section 708, a postings index section 710, and a table of content 712. The symbol table 704, a metric 706, a postings 708, a postings index 710, and a table of content 712 may be further divided into their respective data structures (714-722). The formatted metric metadata 724 may also be referred to at the BIF data structure.

The metric data 702 may be transmitted by a client and received by a datastore, such as 404 from FIG. 4. In this case, there are two metrics, Metric 1 and Metric 2, that are received by the datastore. The metric 702 contains metric data, such as, but not limited to, metric name, account identification, operations, namespace, etc. For Metric 1, the metric name is time, the accounted is 12345, the label has two datapoints which are operation and namespace, the operation is search metric metadata and the namespace is Datastore Service. Each of the metric data 702 is separated such that it is in the format of BIF.

The symbol table 704 may store the set of ordered symbols. Examples of ordered symbols include AccountID, MetricName, Namespace, all label keys and values, etc. The symbols may be stored as a sequence of UTF-8 encoded byte characters. This format may allow encoding of all valid character code points in Unicode through four one-byte (8 bit) code units. Additionally, this format may allow code points with lower numeric values to be encoded using fewer bytes. The symbol table may store a sequence of 4 bytes offsets of where the symbols start and after that the series of ordered symbols. Other byte values can be used and/or the byte value can be configurable. The example symbol table 714 may provide an example of how the data in the symbol table is to be formatted in accordance with at least one embodiment. The example symbol table 714 may be similar to the example symbol table 814 in FIG. 8.

The metric section 706 may store a list of metrics metadata. The metadata may be ordered by AccountID, metric name, label, etc. The example metric section 716 may provide an example of how the metadata in the metric section is to be formatted in accordance with at least one embodiment. The example metric 714 may be similar to the example metric section 922 in FIG. 9.

The postings section 708 may store a list of sequences which may generate a list of metric indices. The metric indices may be referenced from the metric section 706. The postings within the postings section 708 may be ordered by key and value. A sequence holds (start, delta, repeat) which may represent a list of numbers: start, start+1, delta, start+2 delta. The example postings section 718 may provide an example of how the metadata in the postings section is to be formatted in accordance with at least one embodiment. The example metric section 718 may be similar to the example metric section 1010 in FIG. 10.

The postings index section 710 may store the label key-value pairs together with the start of the list of reference in the previous postings section. The key-value pairs may also be ordered by key and value.

The example postings index section 720 may provide an example of how the metadata in the postings index section is to be formatted in accordance with at least one embodiment. The example postings index section 718 may be similar to the example metric section 922 in FIG. 9.

The table of content 712 may store the pointers of each of the sections of the BIF data structure. The table of content 712 may include a pointer to the table of content itself at the head of the list. The table of content 712 may include a pointer to the symbol table in the second row. The table of content 712 may include a pointer to the metrics section following the symbol table in the list. The table of content 712 may include a pointer to the postings index section following the metrics section in the list. The table of content 712 may include a pointer to the postings index section following the metrics section in the list. The example table of content 722 may illustrate an example of this format. It is contemplated, however, that the ordering of the table of content 712 can vary.

To handle queries efficiently, the query service will have to have access to full table of content 722, Symbol Table 714, and Postings Index 720. However, for normal use cases these are a very small fraction of the total index. These can all be accessed for lookup via a binary search. They are cacheable. The postings and Metrics index could be accessed via range gets against the index files stored in computer-implemented storage. The queries should require fairly small parts of the metrics 716 and postings 718 sections. These results are cacheable.

Figure 8:
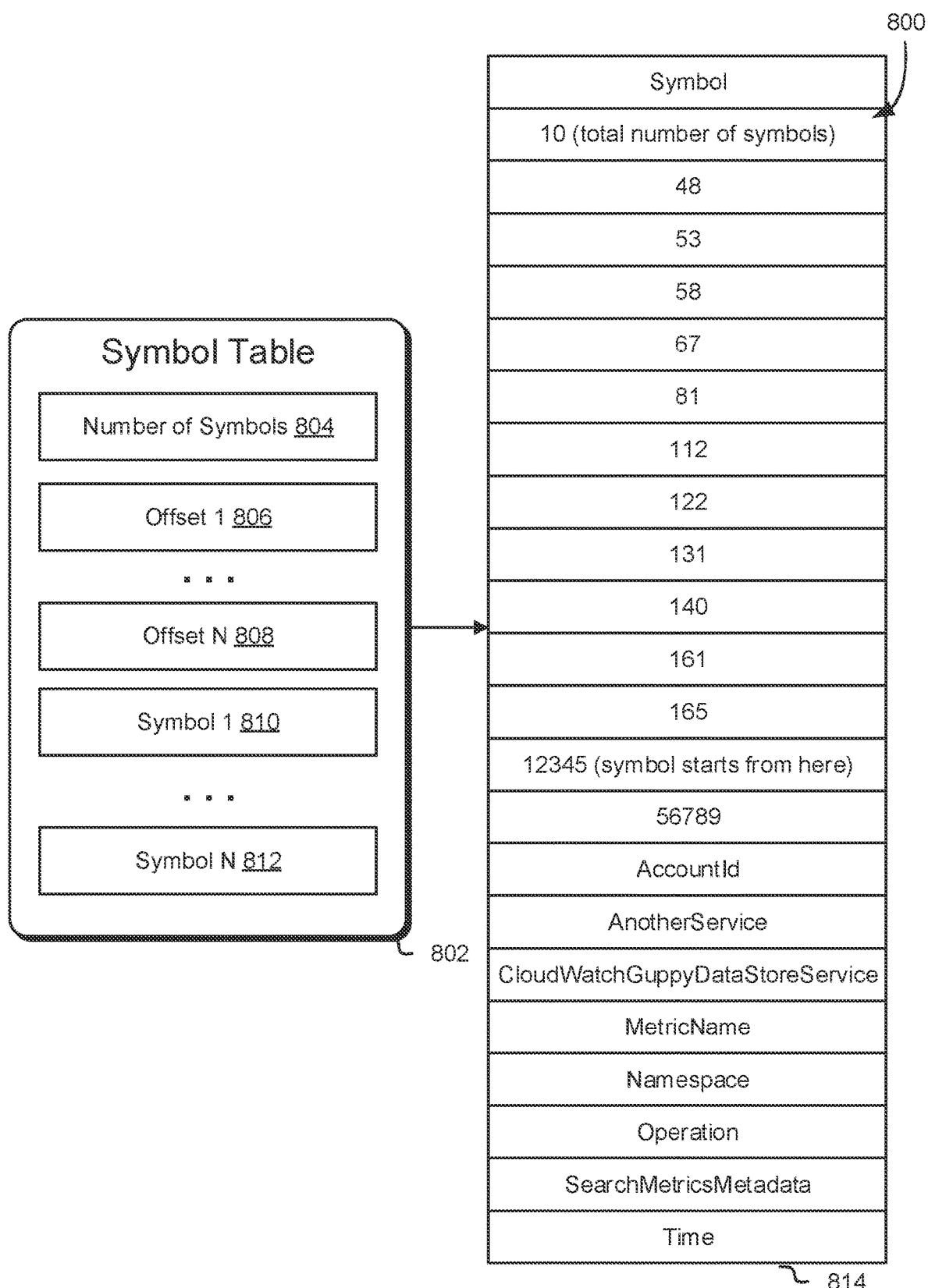
FIG. 8 illustrates an example of the data structure for the symbol table as a part of the binary index format (BIF), according to at least one embodiment.

FIG. 8 illustrates an example of the data structure 800 for the symbol table as a part of the metadata storage in the binary index format (BIF) in accordance to at least one embodiment. Specifically, FIG. 8 shows the symbol table 802 along with the symbol table example 814 with the metric data 702 from FIG. 7.

The symbol table 802 may hold a sorted set of symbols for ingested metrics. The symbol table may be similar to the symbol table 804 in FIG. 8. Subsequent sections of the index point to symbols in the table to reduce significantly the index size and to allow the indices to be traversed using binary search. The data structure symbol table 802 may be cached locally on disk.

The number of symbols 804 may store the amount of symbols in the symbol table. The number of symbols may be less than 4 bytes. Other byte values can be used and/or the byte value can be configurable. The example symbol table 814 stores the total number of symbols as 10 given the metric data 702 from FIG. 7. For example, these symbols from the metric data 702 for Metric 1 and Metric 2 include AccountID, MetricName, Namespace, all label keys and values, and therefore one finds that there are a total of ten symbols.

The symbol table may store a sequence of 4 bytes offsets, for example offset 1 806 and offset N 808, of where the symbol starts. In turn, these offsets allow for a fast binary search when looking for symbols. Other byte values can be used and/or the byte value can be configurable. The binary search may refer to the method (an algorithm) for searching, which finds the position of a target value within a sorted array. The example symbol table 814 stores the offset 1 as 48 given the metric data 702 from FIG. 7. The next data in the array is the previous offset value added to the previous symbol length value, shown in the example symbol table 814 as 53.

The symbol 1 810 may be located after the sequence of offsets. The symbol 1 810-symbol N 812 may be a series of ordered symbols. The example symbol table 814 stores the symbol 1 to be located after the offsets, as 12345, relating to the AccountID from Metric 1 data, as shown in FIG. 7. The symbols may be stored as a bytearray. That is to say that the value "12345" may be stored as [49, 50, 51, 53, 53], etc. The example symbol table 814 stores the symbol 2 to be located after the symbol 1 810, as 56789, relating to the AccountID from Metric 2 data, as shown in FIG. 7. The symbol N 812 may be the last symbol in the series of symbols stored in the symbol table. The symbol table may include all the symbol related metric data from the metric. This is shown in the example symbol table 814, for example, to include AccountID, anotherservice, DataStoreService, MetricName, Namespace, Operation, SearchMetricsMetadata, and Time.

Figure 9:
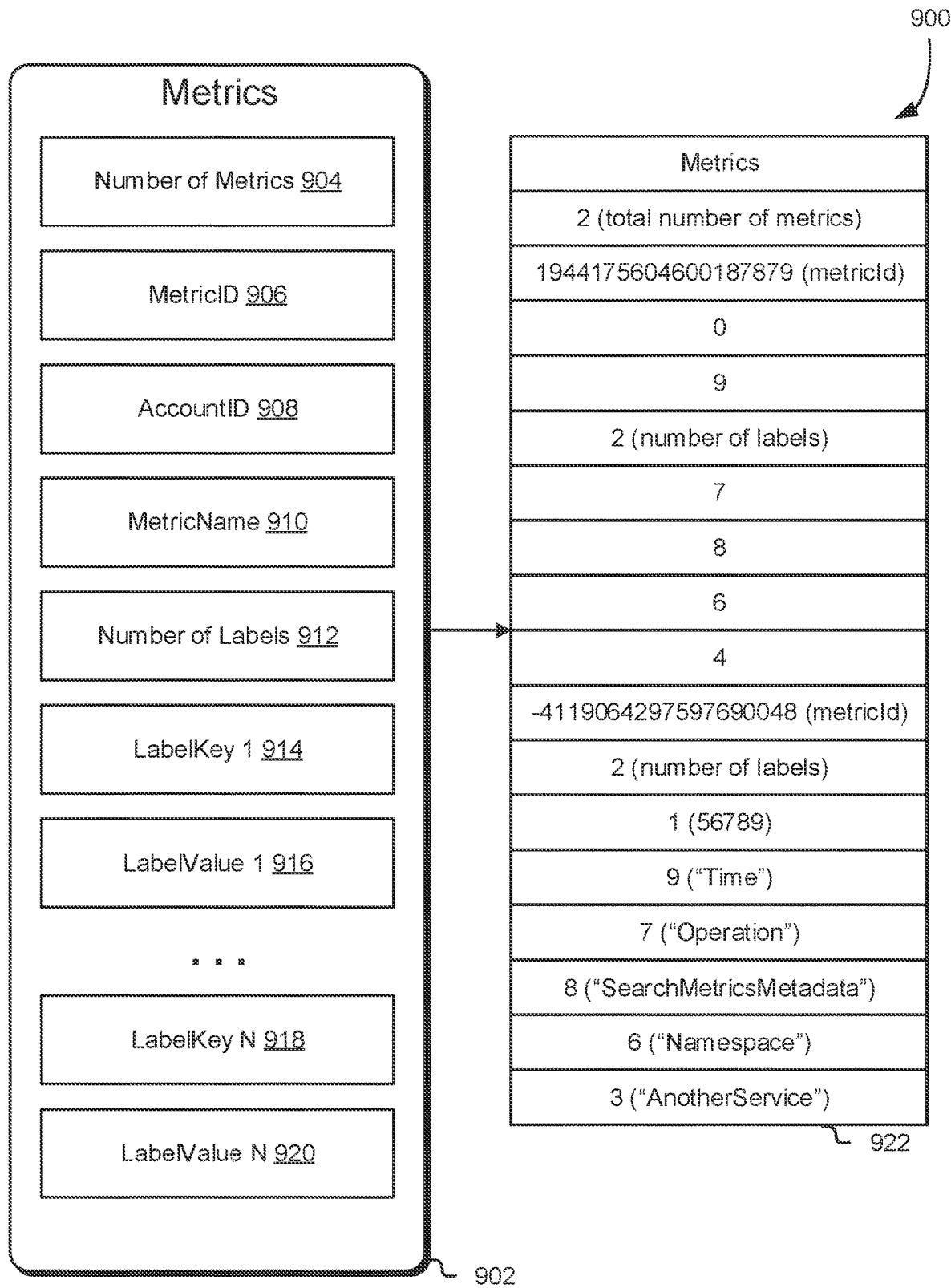
FIG. 9 illustrates an example of the data structure for the metric section as a part of the binary index format (BIF), according to at least one embodiment.

FIG. 9 illustrates an example of the data structure 900 for the metrics section as a part of the metadata storage in the binary index format (BIF) in accordance to at least one embodiment. Specifically, FIG. 9 shows the metrics section 902 along with the metrics section example 922 with the metric data 702 from FIG. 7. The metrics section 902 may include the number of metrics 904 at the first index stored in 4 bytes: this is common between the symbol table, the postings section, and the postings index section. Other byte values can be used and/or the byte value can be configurable. In the metric section example 922, for example, the total number of metrics is two, due to the two metrics, Metric 1 and Metric 2, being ingested into the BIF as shown in FIG. 7. After this point in the metrics section, the metrics can be stored in sequence. That is to say that the 906-916 can be filled in for one metric and then the same THINGS will be asked of for another metric, and the metrics may be separated as shown in the metrics section example 922.

The metric section 902 may compose the metric definition (e.g., the MetricID 906). The metrics section 902 may hold the ordered list of metrics metadata using pointers into the symbol table. Further, the metrics may be ordered by AccountID, metricName, label key, label value. The metric section may also include the list of labels, shown as labelkey 1 914-labelkey N 918 and labelvalue 1 916-labelvalue N 920. In some embodiments label can be namespace, etc. The metrics section may include labelkey N 918 and labelvalue N 920, indicating the end of the stored label key pair for a given metric, and the end of the metrics section 902 for a given metric, such as metric data 702 in FIG. 7.

The MetricID 906 may be the second index and is stored using 8 bytes. Other byte values can be used and/or the byte value can be configurable. In the metric section example 922, for example, one of the MetricIDs is 1944175604600187879, denoting the location and starting point of Metric 1 from the Metric data 702 in FIG. 7. The structure can be sequential in that one sees the metric section example 922, for example, and the other MetricID is −4119064297597690048, denoting the location and starting point of Metric 2 from the Metric data 702 in FIG. 7. The AccountID 908 can indicate the index of the account id in the symbol table. In the metric section example 922, for example, the AccountID is 0, denoting the index of the AccountID ("12345") in the symbol table of Metric 1 from the Metric data 702 in FIG. 7. The MetricName 910 can indicate the index of the metric name in the symbol table. In the metric section example 922, for example, the Metric Name is 9, denoting the index of the metric name ("Time") in the symbol table of Metric 1 from the Metric data 702 in FIG. 7. The number of labels 912 can store the amount of labels stored in the section in 1 byte. Other byte values can be used and/or the byte value can be configurable. In the metric section example 922, for example, the number of labels is 2 due to the two labels denoted in the Metric 1 definition (Operation and Namespace) as being ingested into the BIF from the Metric data 702 in FIG. 7.

The labelkey 1 914 can be the labelkey of the metric data. The labelvalue 1 916 can be the labelvalue of the metric data. In the metric section example 922, for example, the labelkey 1 is 7. This is the index of "Operation" in the symbol table for Metric 1 from the metric data 702 in FIG. 7. Additionally, in the metric section example 922, the labelkey 1 is 6. This is the index of Namespace in the symbol table for Metric 1 from the metric data 702 in FIG. 7. Further, the labelvalue following is 4. This is the index of "DataStoreService" in the symbol table for Metric 1 from the metric data 702 in FIG. 7. The same structure applies for the Metric 2 in the metric section example 922 (metric id, number of labels, etc.).

The metrics table becomes larger as one is organizing and storing MetricIDs, such as MetricID 906; therefore only a small range may be located to answer queries. A small part of the metrics section 902 only may need to be retrieved when querying.

Figure 10:
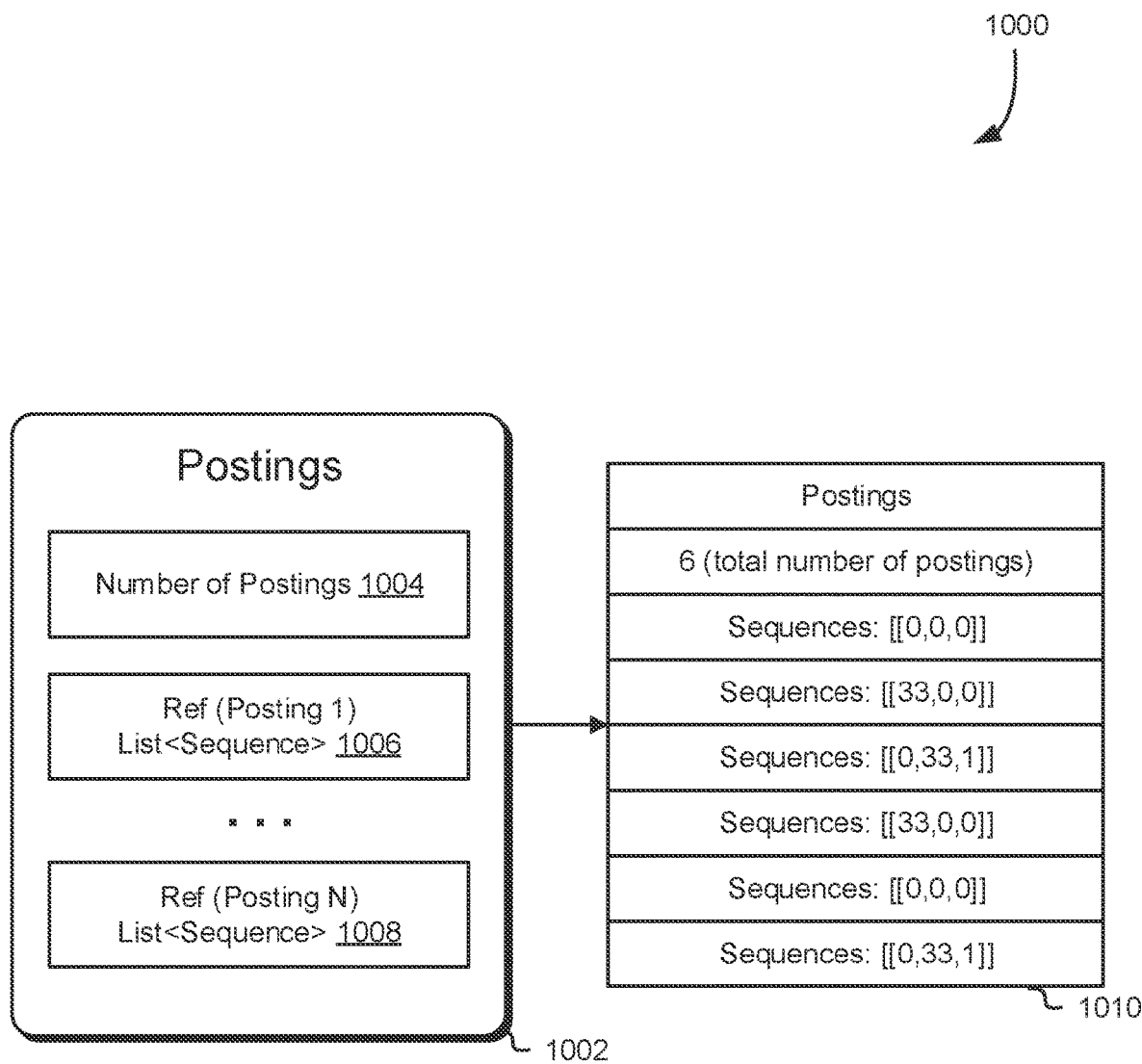
FIG. 10 illustrates an example of the data structure for the postings section as a part of the binary index format (BIF), according to at least one embodiment.

FIG. 10 illustrates an example of the data structure 1000 for the postings section as a part of the metadata storage in the binary index format (BIF) in accordance to at least one embodiment. Specifically, FIG. 10 shows the postings section 1002 along with the postings section example 1010 with the metric data 702 from FIG. 7. A posting may be a key-value pair together with a list of indices that reference into the metrics table, and each are 4 bytes. Other byte values can be used and/or the byte value can be configurable. The postings can be pointers that point to key values. The postings section can store a list of metrics in a form of a sequence to use all 12 bytes. Other byte values can be used and/or the byte value can be configurable.

The postings section can include the number of postings 1004. This is shown, for example, as 6 in the postings section example 1010. The postings section can store the ordered list of reference for each posting key-value pair sequentially, shown as the Ref (Posting 1) 1006-(Posting N) 1008. Within the postings themselves, such as 1006, within the sequence the first number may be the start point, the second number may be the data, and the third may be repetition. In the postings section example 1010, for example, the Ref Posting 1 sequence is [[0,0,0]]. That is to say that the starting point of the metric is at 0 in the symbol table, and 0 is the value of the metric point and it is repeated 0 times. This is the posting for which the key is the AccountID and the value is 12345 and the list of indices that reference into the metrics table for Metric 1 from the metric data 702 in FIG. 7. Internally each list of references can encode as a list of sequences.

Figure 11:
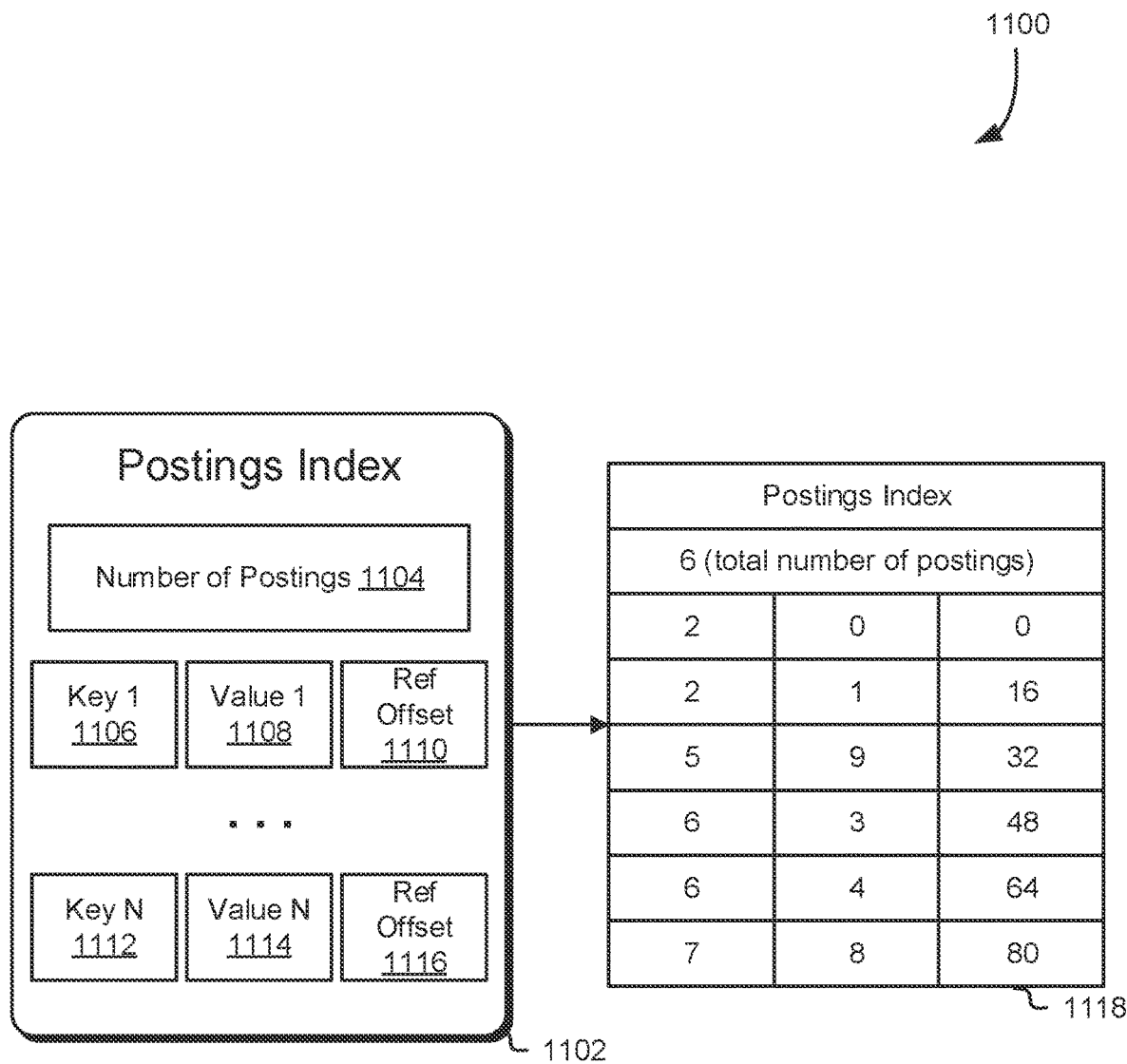
FIG. 11 illustrates an example of the data structure for the postings index section as a part of the binary index format (BIF), according to at least one embodiment.

FIG. 11 illustrates an example of the data structure for the postings index section 1100 as a part of the metadata storage in the binary index format (BIF) in accordance to at least one embodiment. Specifically, FIG. 11 shows the postings section 1102 along with the postings section example 1118 with the metric data 702 from FIG. 7. The posting index section 1102 may contain a number of postings 1104, which may describe the number of postings in 4 bytes. Other byte values can be used and/or the byte value can be configurable. The PostingsIndex section may store an ordered set of label key-value pairs for metrics in the index together with the start of the list of references in the Postings section.

The key 1 1106 may be a key stored in 4 bytes. The value 1 1108 may be a value associated with the key stored in 4 bytes. The reference offset 1110 may be an offset stored in 4 bytes. Other byte values can be used and/or the byte values can be configurable. In the postings index section example 1118, for example, the key (in the third row) is 2. This is the AccountID's index in the symbol table for Metric 1 from the metric data 702 in FIG. 7. Further, in the postings index section example 1118 the value is 0. This is the because the value associated with the AccountID (12345) is 0. Lastly, in the postings index section example 1118 the reference offset is 0. This is because the Metric 1's AccountID data is the first metric data stored. It is contemplated, however, that the example key value encoded pairs may vary.

The key N 1112 may be similar to key 1 1106 as described herein. The value N 1114 may be similar to value 1 1108 as described herein. The reference offset 1116 may be similar to reference offset 1110 as described herein. The postings index section is able to not be fully retrieved for every data retrieval and processing, only parts of the postings index section need to be accessed.

Figure 12:
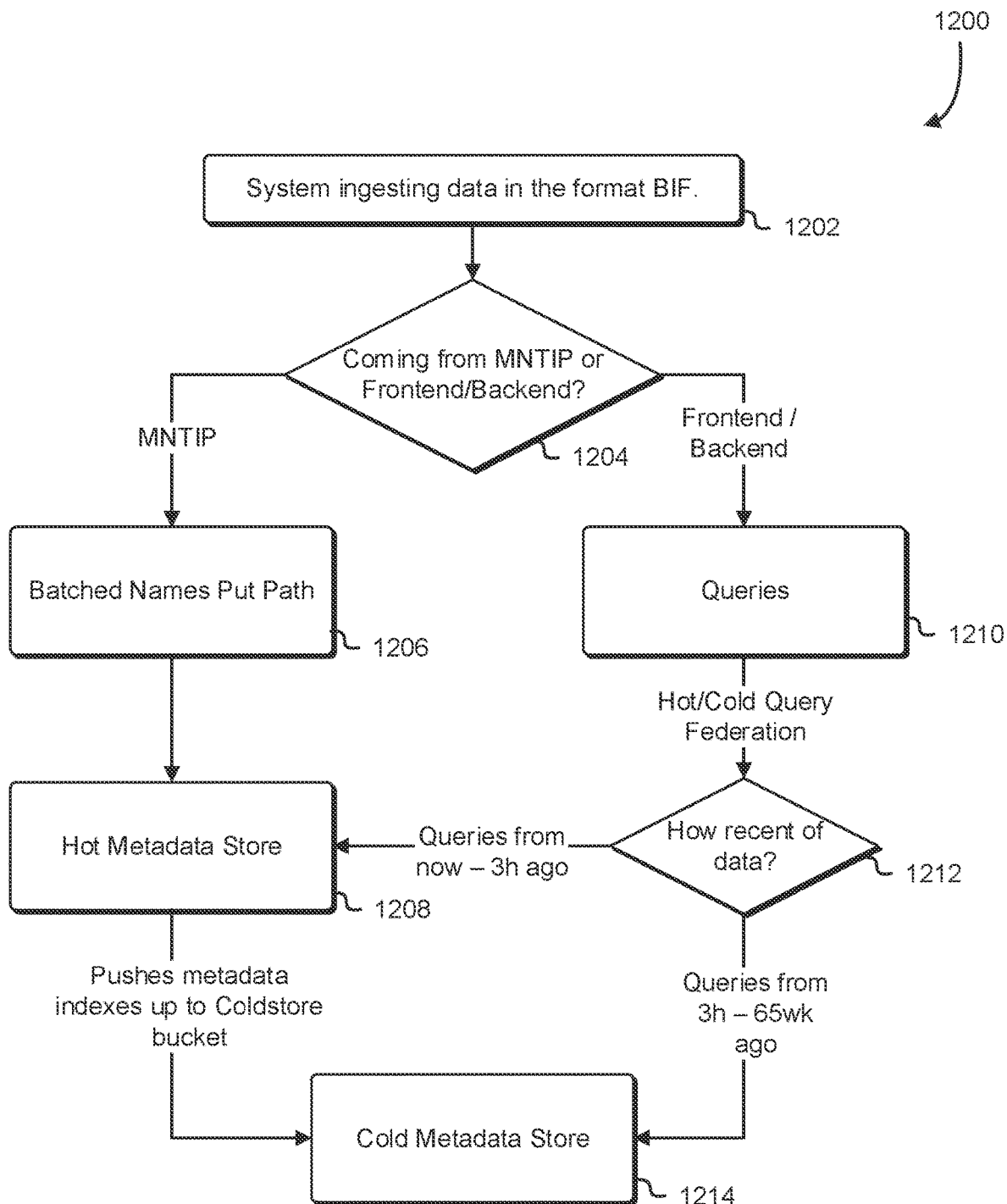
FIG. 12 is a data flow diagram that illustrates how the SQL based query engine path is integrated into the metric name timestamp ingestion pipeline (MNTIP), according to at least one embodiment.

FIG. 12 illustrates an example data flow diagram 1200 that may be associated with one or more of the described system environments, to ingest and store metric data, according to at least one embodiment. In some implementations, the acts of the flow diagram 1200 are executed by one or more computing devices of the example system environments described herein. The example system environments may execute computer-executable instructions incorporating at least some of the processing acts of the flow diagram 1200 to ingest and store metric data according to at least one of the embodiments described herein.

The particular implementation of the technologies disclosed herein is a matter of choice dependent on the performance and other requirements of the computing device. Accordingly, the logical operations, also referred to as acts, described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein. It should also be understood that the methods described herein can be ended at any time and need not be performed in their entireties.

Some or all operations of the methods described herein, and/or substantially equivalent operations, can be performed by execution of computer-readable instructions included on a computer-storage media. The term "computer-readable instructions," and variants thereof, is used in the description and claims, and is used expansively herein to include routines, applications, application modules, program modules, system modules, programs, components, data structures, algorithms, and the like. Computer-readable instructions can be implemented on various system configurations, including single-processor or multiprocessor systems, mini-computers, mainframe computers, distributed computer systems, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules might be implemented in software, in firmware, in special purpose digital logic, and any combination thereof.

At 1202, a system is receiving and ingesting some metric data in the format of BIF for the purpose of storing the formatted metric data metadata into either cold or hot metadata stores. In at least one embodiment, the metadata is being collected and stored into a respective datastore for purpose of serving query requests. In at least one embodiment, the formatted metadata can correspond to the formatted metric metadata 724. In at least one embodiment, the system can correspond to the architecture 400 (e.g., the infrastructure which collects and tracks metadata).

At 1204 the system 1200 may determine where the data was sent from. The determination may be performed by, but not limited to, an algorithm, a service, a machine learning model, and/or any other suitable module which is capable of executing a set of instructions for determining the origin of a metric data. If the data originated from the metric name timestamp ingestion pipeline, such as the metric name timestamp ingestion pipeline 402 discussed in FIG. 4, the data may be siloed into the batched names put path 1206. Following this the data is immediately stored in the hot metadata store 1208, which may be similar to the hot metadata store 404 as detailed in FIG. 4.

If the data originated from the frontend, the data may be siloed into the queries 1210. Following this, the system moves to 1212 and determines how recent the ingested data/query is. If the query is determined to be older than 3 hours, for example, or some other configurable time frame, the data is stored in the Cold Metadata store 1214. However, in such an example, if the query is determined to be newer than 3 hours, the data is stored in the Hot Metadata store 1208. Finally, the Hot Metadata store 1208 sends the metadata indexes up to Coldstore bucket (e.g., the Cold Metadata Store 1214). Additional acts can be associated with the flow diagram 1200.

Figure 13:
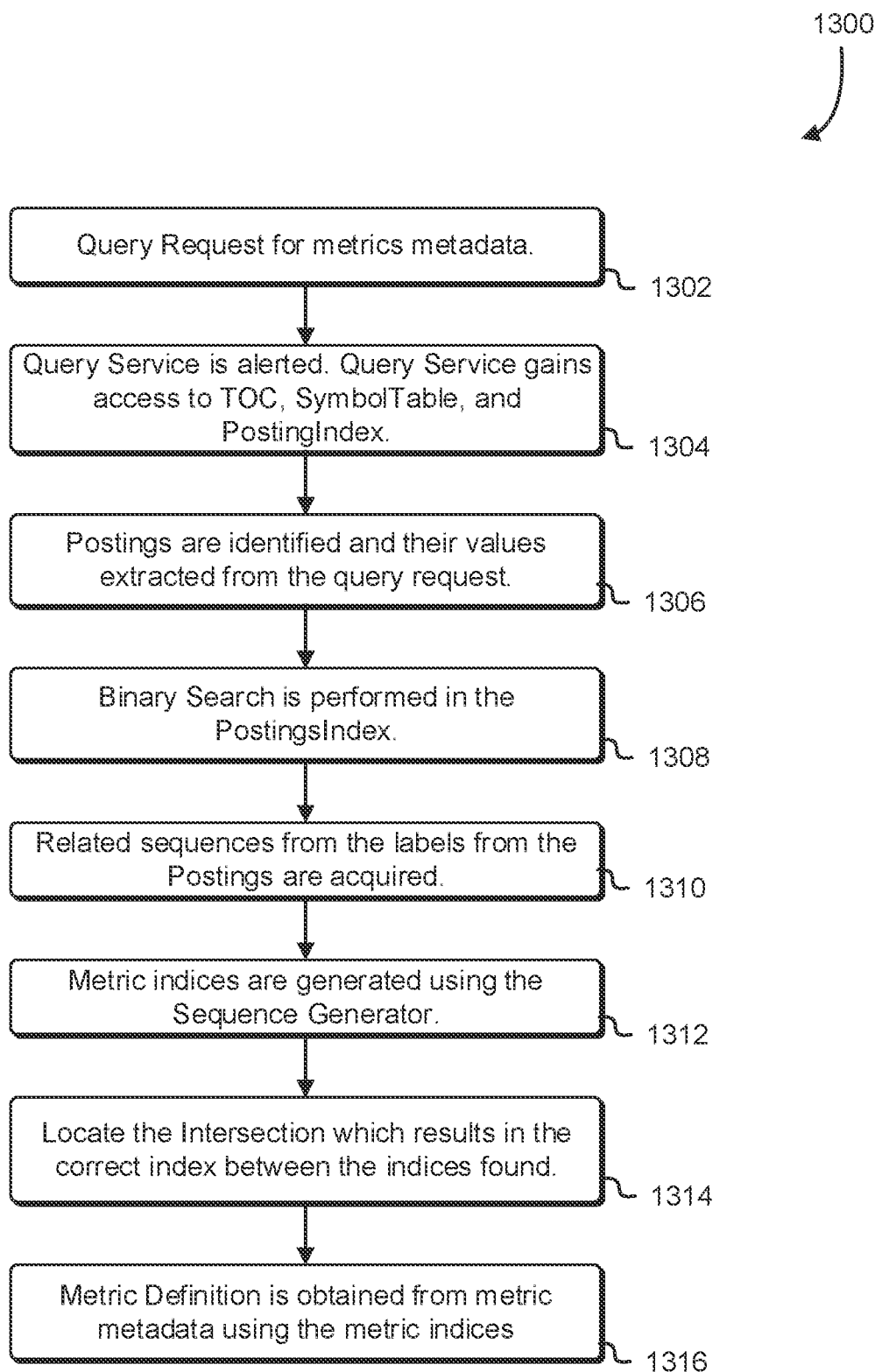
FIG. 13 is a data flow diagram that illustrates how a query is handled using the BIF, according to at least one embodiment.

FIG. 13 illustrates an example data flow diagram 1300 that may be associated with one or more of the described system environments, to handle a query in the format of BIF, according to at least one embodiment. In some implementations, the acts of the flow diagram 1300 are executed by one or more computing devices of the example system environments described herein. The example system environments may execute computer-executable instructions incorporating at least some of the processing acts of the flow diagram 1300 to handle queries in the format of BIF according to at least one of the embodiments described herein. These operations can also be performed in a different order than those described herein. It should also be understood that the methods described herein can be ended at any time and need not be performed in their entireties.

At 1302 a query request is sent to obtain metrics metadata. The query request may be sent by an individual, an organization, an automated system (or set of systems), or any other suitable module that may be capable for executing instructions to transmit a query request. The query request may in some embodiments be sent by the querier 110. In some embodiments, the query request may be understood by the backend service of the frontend/backend service 406. In some embodiments, metrics metadata may correspond to the formatted metric metadata 724.

At 1304 a query service is alerted. The query service may correspond to the querier 110 in some embodiments. The query service may gain access to the table of content, symbol table, and postings index of the metric data as stored in the formatted metric metadata 724. The table of content may correspond to the table of content 722. The symbol table may correspond to the symbol table 714. The postings index may correspond to the postings index 720. In some embodiments, the symbol table, the postings index, and the table of content may all be cacheable.

At 1306 the postings are identified and their values are extracted from the query request. The identification and extraction of the sections of the formatted metric metadata 724 may correspond and be performed by backend of the frontend/backend service 406.

At 1308 a binary search is performed in the postings index. At 1310 related sequences from the labels from the postings section are acquired. At 1312 the metric indices are generated using the sequence generator. At 1314 the system locates the intersection which results in the correct index being identified between the found indices. That is to say, if there may be more than one metric stored in the formatted metric metadata, the system would locate the intersection for the appropriate metric. At 1316 the metric definition is obtained from the metrics section, using the BIF metric indices. The metrics section may correspond to metrics section 902 in some embodiments. The metric definition may be cacheable. Additional acts can be associated with the flow diagram 1300.

Figure 14:
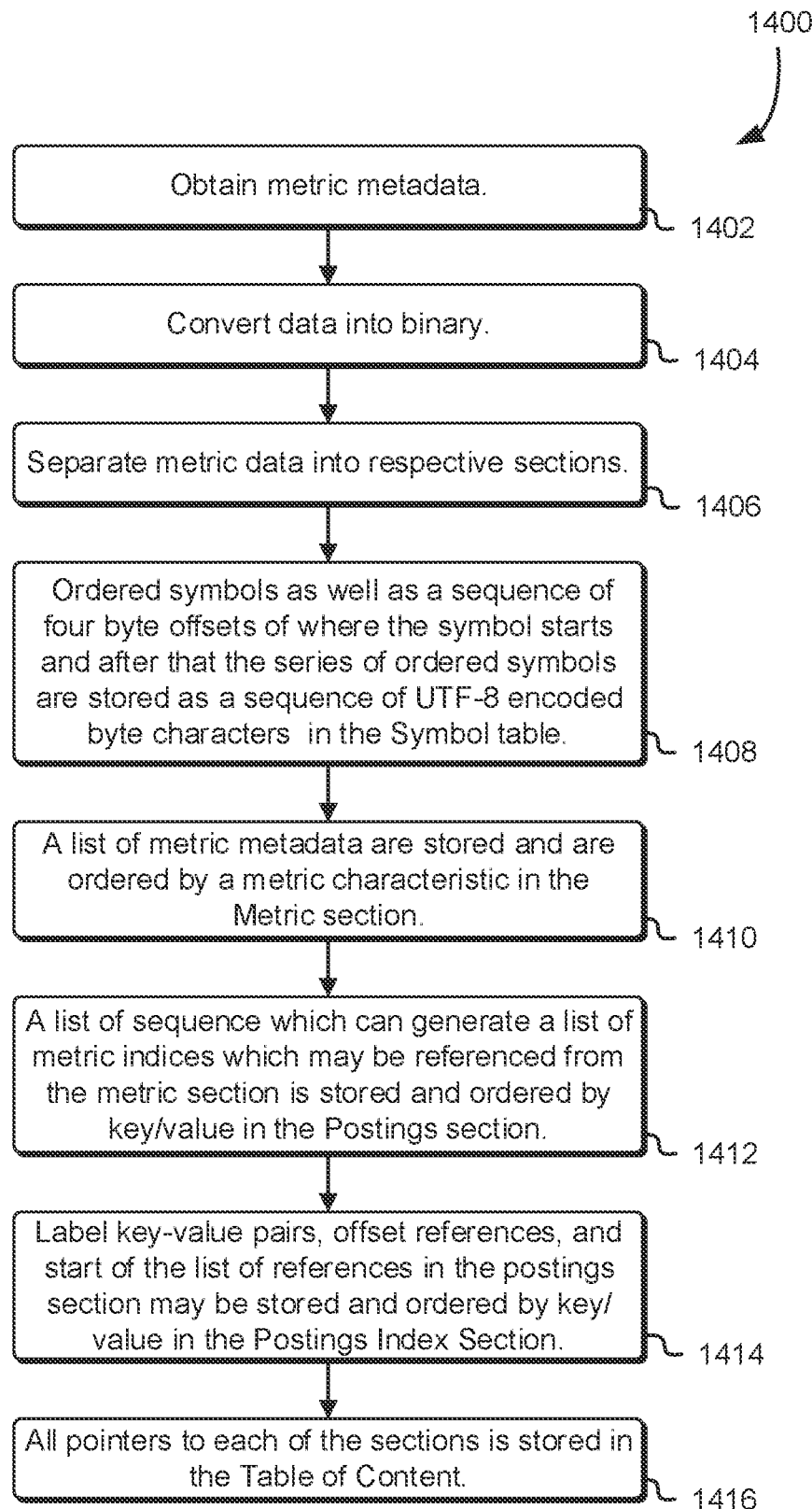
FIG. 14 is a data flow diagram that illustrates how metric data is stored in BIF, according to at least one embodiment.

FIG. 14 illustrates an example data flow diagram 1400 that may be associated with one or more of the described system environments, to store metric data in BIF, according to at least one embodiment. In some implementations, the acts of the flow diagram 1400 are executed by one or more computing devices of the example system environments described herein. The example system environments may execute computer-executable instructions incorporating at least some of the processing acts of the flow diagram 1400 to store metric data in the format of BIF according to at least one of the embodiments described herein. These operations can also be performed in a different order than those described herein. It should also be understood that the methods described herein can be ended at any time and need not be performed in their entireties.

At 1402 metric data is obtained by a system. The system may correspond to the infrastructure which collects and tracks metadata 400. At 1404 the obtained metric metadata is converted into binary. At 1406 the metric data is separated into its respective sections. The sections may correspond to the formatted metric metadata data structure 724. The sections may correspond to the symbol table 707, the metric section 706, the postings 708, the postings index 710, and the table of content 712.

At 1408 the symbol table is generated. The symbol table may order the symbols as well as a sequence of 4 byte offsets. Other byte values can be used and/or the byte value can be configurable. The symbol table may correspond to the symbol table 802 in some embodiments. In some embodiments, the offset may correspond to the offset 1 806. The offsets may be representative of where the symbol starts and after such a value, the series of ordered symbols are stored. These ordered symbols are stored as a sequence of UTF-8 encoded byte characters as described herein.

At 1410 the metric section is generated. The metric section may correspond to the metric section 902. The metric section may contain a list of stored metric metadata. The metric metadata may be ordered by a metric characteristic, such as MetricID 906, AccountID 908, etc. as described herein. At 1412 the postings section is generated. The postings section may contain a list of sequences which can generate a list of metric indices. The metric indices may be referenced from the metric section, such as Ref (Posting 1) 1006 in FIG. 10. The metric indices may be stored and ordered as key-value pairs in the postings section.

At 1414 the postings index section is generated. The postings index section may contain a label key-value pairs and offset references, such as Key 1 1106, Value 1 1108, and Ref Offset 1110. These label key-value pairs may be paired together with the start of the list of references in the posting section. The label key-value pairs may be stored and ordered by key and value in the postings index section. At 1416 the table of content is generated. The table of content may contain pointers to each of the sections. Additional acts can be associated with the flow diagram 1400.

Figure 15:
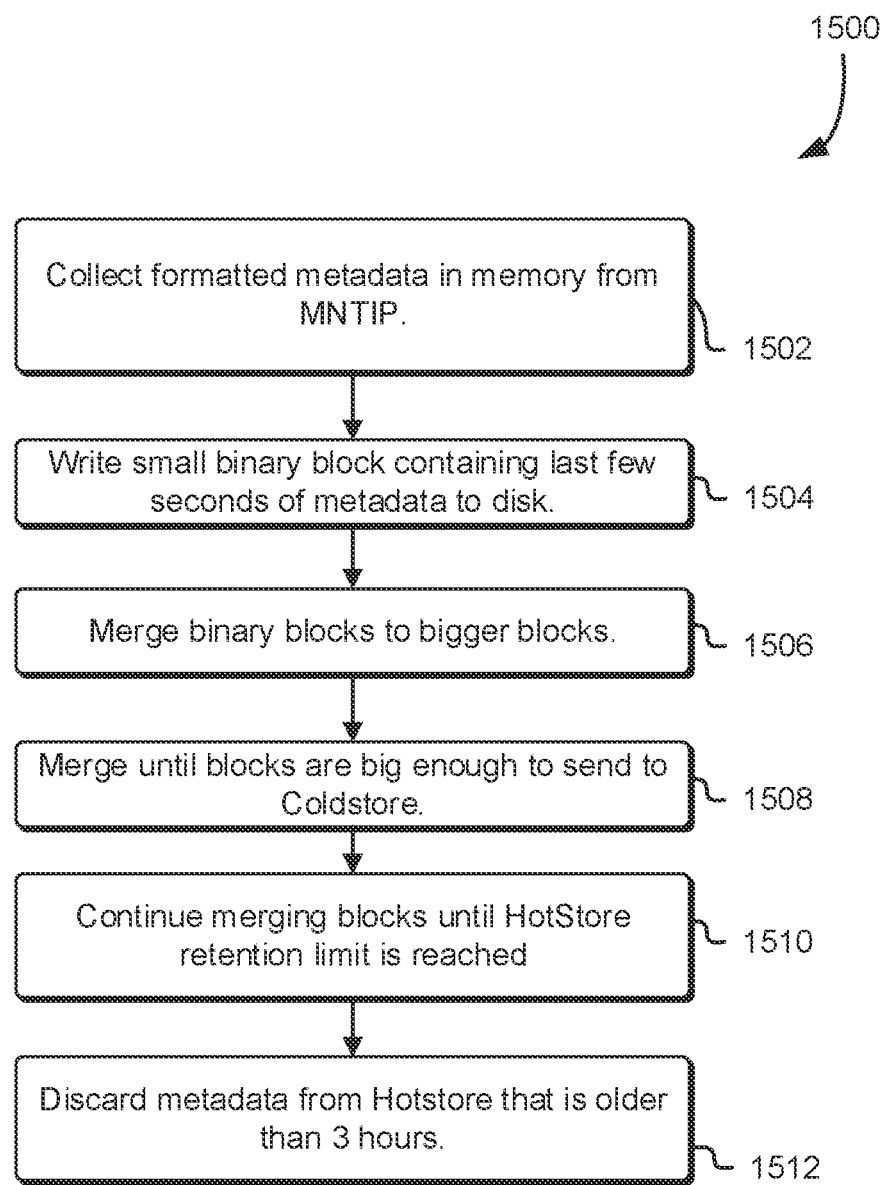
FIG. 15 is a data flow diagram that illustrates how the hot metadata store operates for HotStore, according to at least one embodiment.

FIG. 15 illustrates an example data flow diagram 1500 that may be associated with one or more of the described system environments, to store metadata into a hotstore by a hot metadata store, according to at least one embodiment. In some implementations, the acts of the flow diagram 1500 are executed by one or more computing devices of the example system environments described herein. The example system environments may execute computer-executable instructions incorporating at least some of the processing acts of the flow diagram 1500 to store metadata into a hotstore by a hot metadata store according to at least one of the embodiments described herein. These operations can also be performed in a different order than those described herein. It should also be understood that the methods described herein can be ended at any time and need not be performed in their entireties.

At 1502 the formatted metadata is collected in memory from a metric name timestamp ingestion pipeline to be stored in the hot metadata store. The formatted metadata may correspond to the formatted metadata 724. The metric name timestamp ingestion pipeline may correspond to the metric name timestamp ingestion pipeline 402. At 1504 a small binary block is written to disk that contains the metadata over a period of time (last few seconds). The hot metadata store may have an internal module that is called with every new name being ingested. The internal modules may be an algorithm, a machine learning model, and/or any suitable module which may execute instructions to store each name ingested into memory.

At 1506 the binary blocks are merged to become bigger blocks, in accordance with processes described herein. At 1508 the blocks continue to merge until the blocks are big enough to send to the coldstore, in some embodiments. At 1510 the blocks continue to merge until the HotStore retention limit is reached. At 1512 metadata older than 3 hours, for example, in the hotstore is discarded, in accordance with processes described herein. Additional acts can be associated with the flow diagram 1500. In at least one embodiment, the 3 hour time period is configurable.

Figure 16:
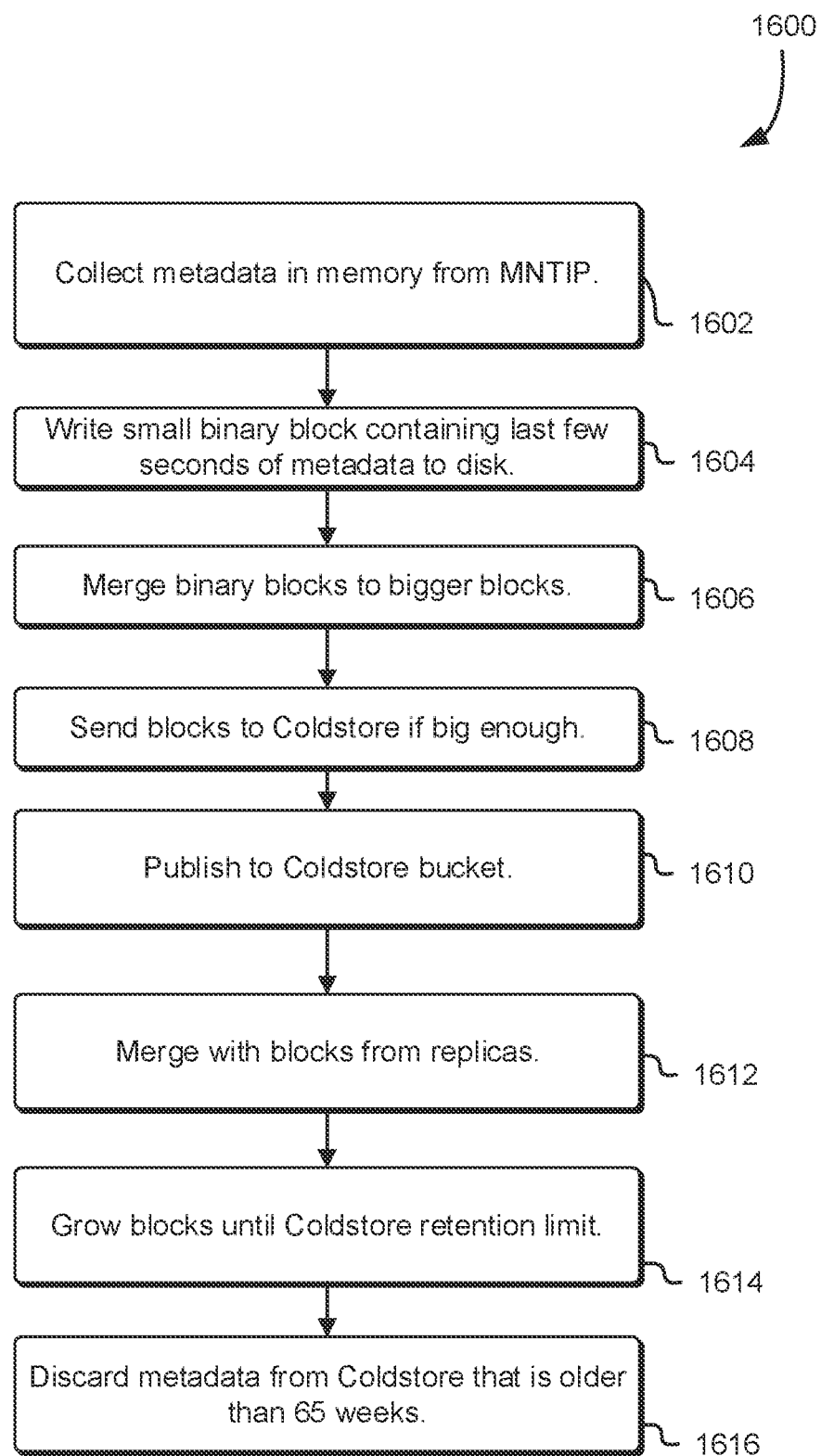
FIG. 16 is a data flow diagram that illustrates how the hot metadata store operates for Coldstore, according to at least one embodiment.

FIG. 16 illustrates an example data flow diagram 1600 that may be associated with one or more of the described system environments, to store metadata into a coldstore by a metadata store, according to at least one embodiment. In some implementations, the acts of the flow diagram 1600 are executed by one or more computing devices of the example system environments described herein. The example system environments may execute computer-executable instructions incorporating at least some of the processing acts of the flow diagram 1600 to store metadata into a coldstore by a metadata store according to at least one of the embodiments described herein. These operations can also be performed in a different order than those described herein. It should also be understood that the methods described herein can be ended at any time and need not be performed in their entireties.

At 1602 the metadata is collected in memory from the similar to that of metric name timestamp ingestion pipeline 402 in FIG. 4. At 1604 a small binary block is written to disk that contains the last few seconds of metadata. At 1606 the binary blocks are merged to become bigger blocks, in accordance with processes described herein. At 1608 the blocks continue to merge until the blocks are big enough to send to the coldstore, in some embodiments. At 1610 the blocks are published to the coldstore bucket, such as that described in FIG. 4. At 1612 the blocks are merged with blocks from replicas. At 1614 the blocks are merged until the Coldstore retention limit is reached. At 1616 the metadata is discarded from the coldstore if the data is older than 65 weeks. Additional acts can be associated with the flow diagram 1600.

Figure 17:
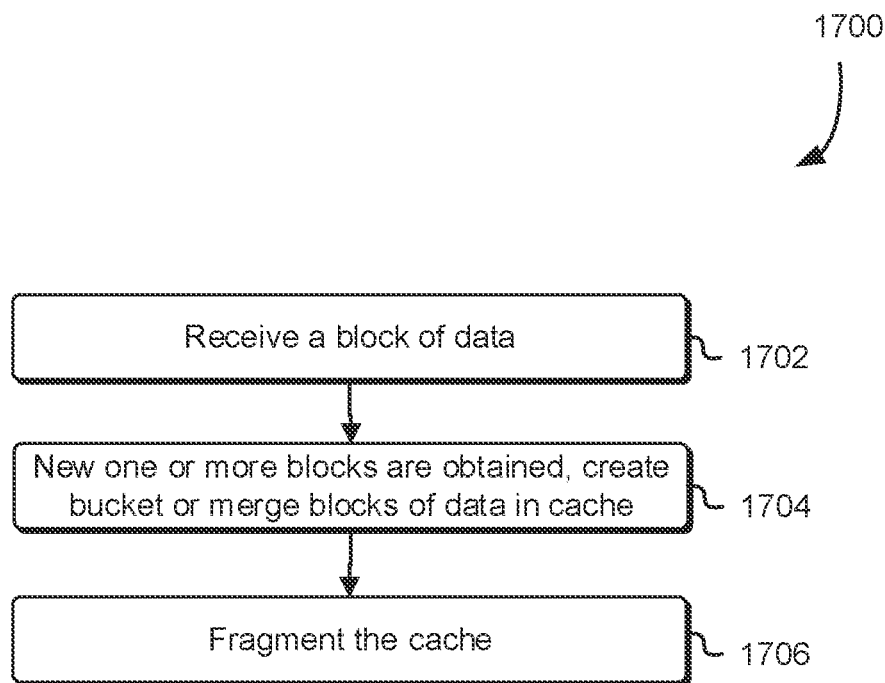
FIG. 17 is a data flow diagram that illustrates caching, according to at least one embodiment.

FIG. 17 illustrates an example data flow diagram 1700 that may be associated with one or more of the described system environments, according to at least one embodiment. In some implementations, the acts of the flow diagram 1700 are executed by one or more computing devices of the example system environments described herein. The example system environments may execute computer-executable instructions incorporating at least some of the processing acts of the flow diagram 1700 to cache blocks of data and create buckets of cached the data according to at least one of the embodiments described herein. These operations can also be performed in a different order than those described herein. It should also be understood that the methods described herein can be ended at any time and need not be performed in their entireties.

At 1702, a block of data is received. This block of data can comprise metadata, where the metadata includes metric data determined from analysis of computer associated resources. One or more systems can store many blocks of data. These blocks of data can be used to answer query requests for data, such as data that includes metric data.

At 1704, one or more blocks of data are obtained. These blocks of data can be stored in a cache. This cache can be associated with a computer-implemented querier that processes query requests and returns blocks of data corresponding to those query requests. At least one embodiment, at 1704, the blocks can be stored in one or more computer-implemented buckets, such as segmented portions of cache. In at least one embodiment, the querier can emerge one or more blocks of data to create a merged block of data corresponding to the one or more blocks of data that were merged. The merged block of data can comprise an amount of data that is less than a total amount of data corresponding to the one or more blocks of data before they were merged.

At 1706, the cache can be a fragmented. Specifically, blocks of data associated with the cache can be segmented into segmented portions of the cache.

Figure 18:
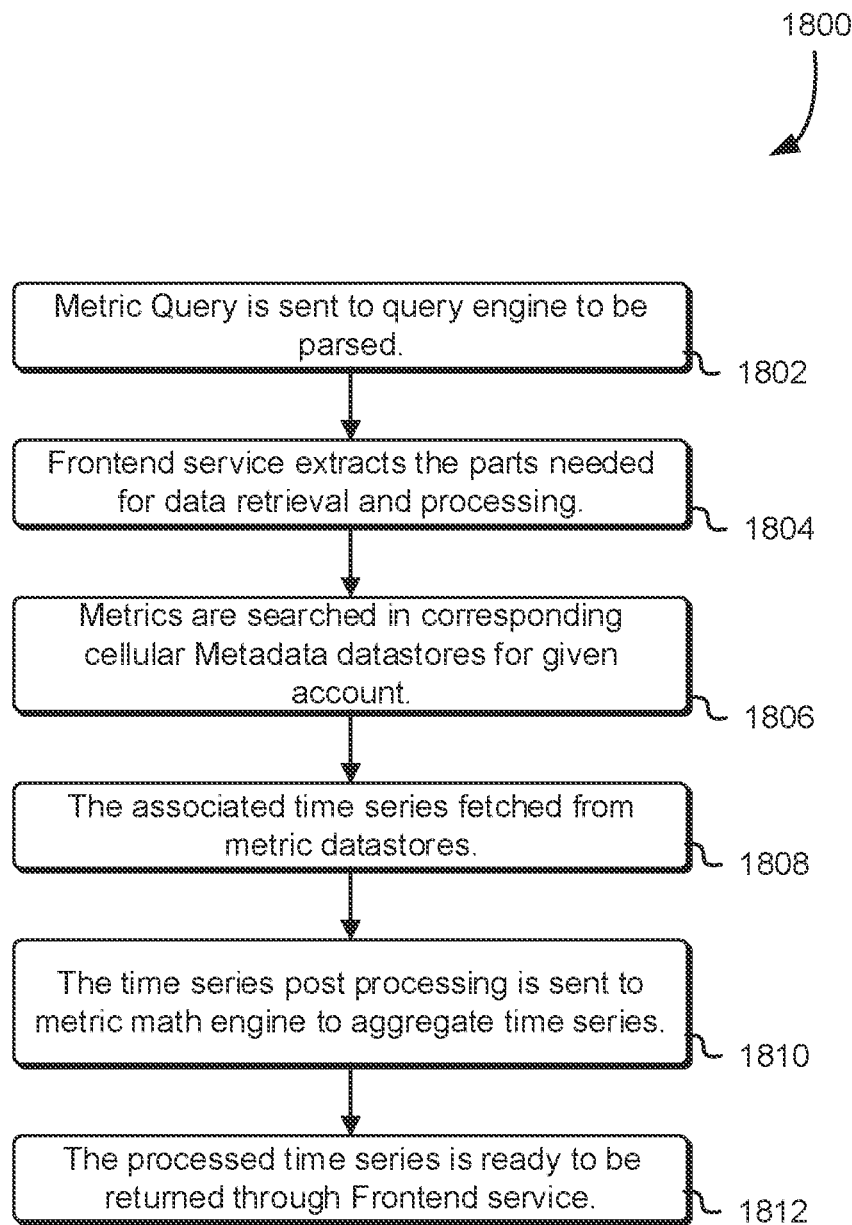
FIG. 18 is a data flow diagram that illustrates how the querier finds and retrieves metrics and places them in groups specified in a query, according to at least one embodiment.

FIG. 18 illustrates an example data flow diagram 1800 that may be associated with a one or more of the described system environments to complete frontend query processing, according to at least one embodiment. In some implementations, the acts of the flow diagram 1800 are executed by one or more computing devices of the example system environments described herein. The example system environments may execute computer-executable instructions incorporating at least some of the processing acts of the flow diagram 1800 to complete frontend query processing according to at least one of the embodiments described herein. These operations can also be performed in a different order than those described herein. It should also be understood that the methods described herein can be ended at any time and need not be performed in their entireties.

At 1802 a metric query is sent to the query engine to be parsed. At 1804 the frontend service extracts the parts needed for data retrieval and processing, including but not limited to the metadata datastore cells. At 1806 metrics are searched in corresponding cellular metadata datastores similar to for example the HMS Cell1 AZ2 618 in FIG. 6 for given account. At 1808 the associated time series is fetched from the metric datastores. At 1810 the time series post processing is sent to the metric math engine (an engine that has the ability to process time series) to aggregate the time series. At 1812 the processed time series is ready to be returned through the frontend service. Additional acts can be associated with the flow diagram 1800.

Figure 19:
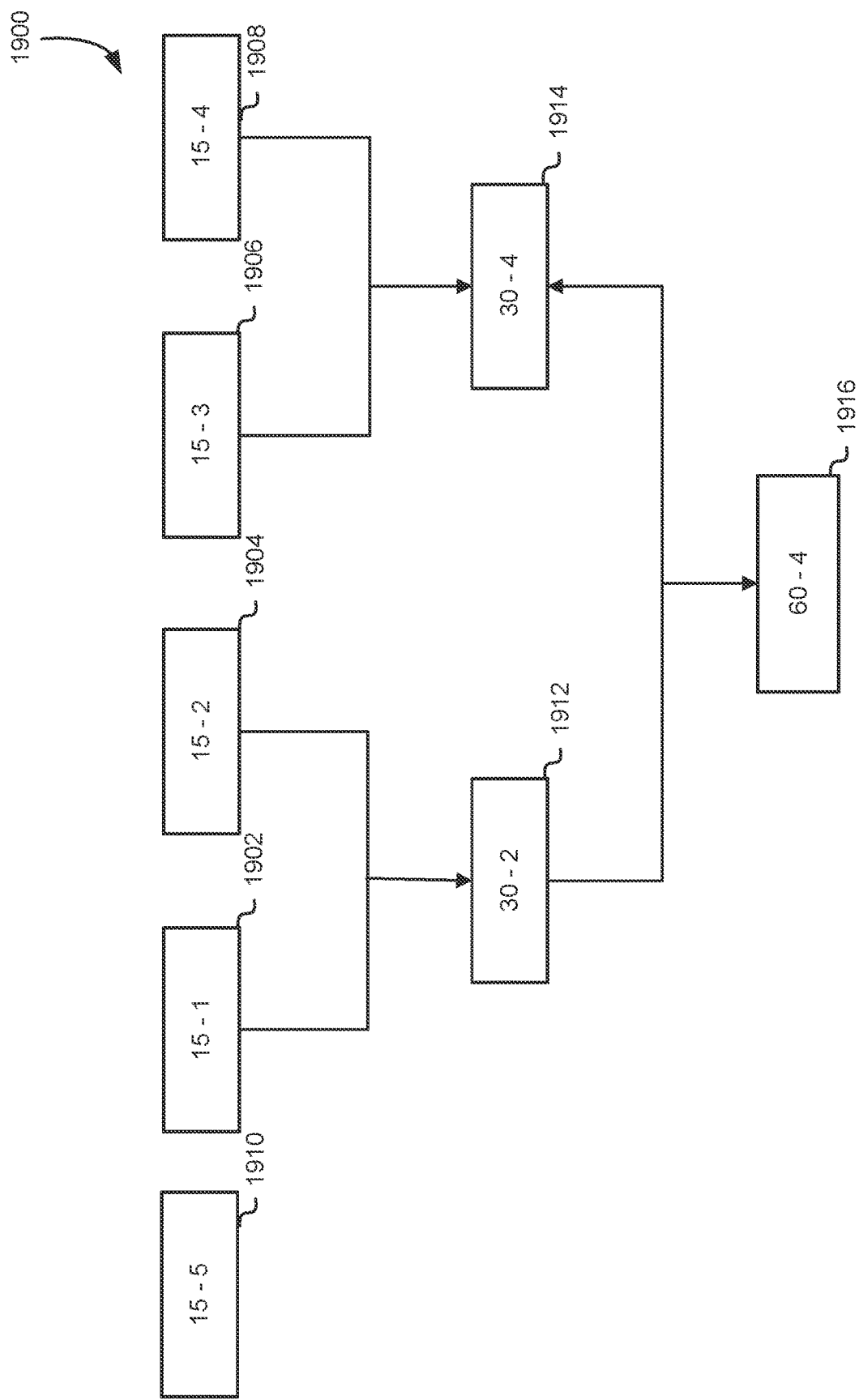
FIG. 19 illustrates an example of a mechanism to merge and name blocks within a metadata store, according to at least one embodiment.

FIG. 19 illustrates an example 1900 of a mechanism to merge and name blocks within a metadata store. The example 1900 may show how blocks are named and how their name evolves when they get merged. The example 1900 contains blocks that may be merged, including blocks 1902-1916.

Each block may be identified with the data retention; in this example, 15 stands for 15 seconds (shown as the most left-hand number in the block). Further, a monotonic sequencing number or wall-clocked timestamp (the example in the diagram shows a monotonic sequencing for simplicity) is also denoted in the example 1900 (shown as the most right-hand number in the block). The data retention side of the block name may help to identify how much data is contained in a block.

However, the first part of the name can be chosen differently as long as the blocks that are candidates for merging have the same left-identifier. When two blocks are merged, the new block may be named after its data retention and the most recent (biggest) sequence number of the two blocks. For instance, block 1902 and 1904 are two blocks of 15 seconds with sequence number 1 and 2, and the block 1902 and 1904 will generate a block 30-2 when merged, as shown in block 1912.

In the wall-clocked case, for example, two blocks of 15 seconds with timestamp 10 and 20 will generate a block 30-20 when merged. This naming strategy may make it easier to understand which data is contained within the blocks. For instance, that looking at block 60-8, it is easy to say that it contains data from 2 blocks 30-6, 30-8, or saying that it contains data from four 15 seconds blocks in the sequence [5-8].

Figure 20:
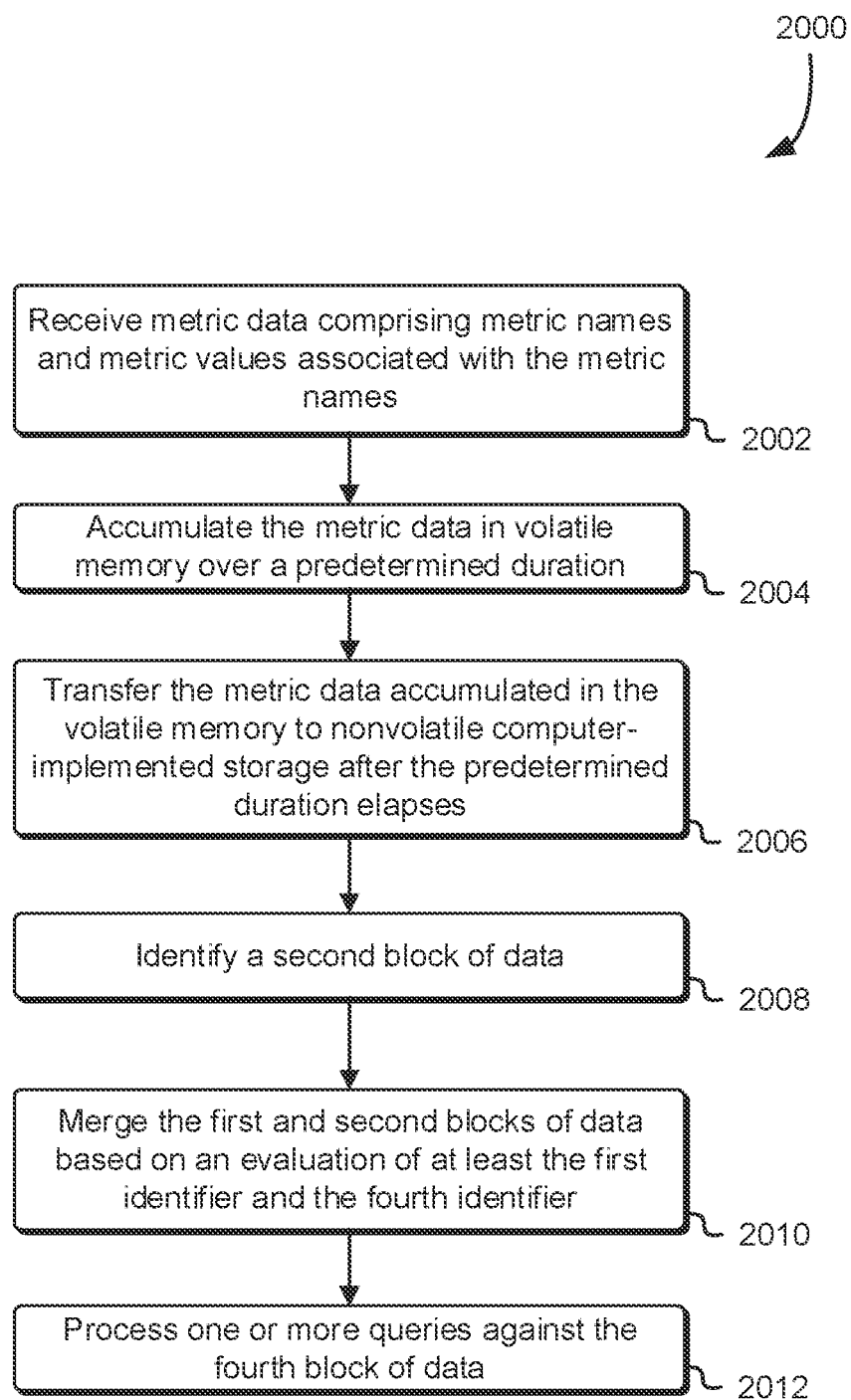
FIG. 20 illustrates an example flow diagram that may be associated with one or more of the described system environments to merge blocks data, according to at least one embodiment.

FIG. 20 illustrates an example data flow diagram 2000 that may be associated with a one or more of the described system environments to accumulate and merge metric data to process one or more queries, according to at least one embodiment. In some implementations, the acts of the flow diagram 2000 are executed by one or more computing devices of the example system environments described herein. The example system environments may execute computer-executable instructions incorporating at least some of the processing acts of the flow diagram 2000 to accumulate and merge metric data to process one or more queries according to at least one of the embodiments described herein. These operations can also be performed in a different order than those described herein. It should also be understood that the methods described herein can be ended at any time and need not be performed in their entireties.

At 2002, metric data comprising metric names and metric values associated with the metric names is received.

At 2004, the metric data in volatile memory is accumulated over a predetermined duration.

At 2006, the metric data accumulated in the volatile memory is transferred to nonvolatile computer-implemented storage after the predetermined duration elapses. In at least one embodiment, the metric data may be transferred as a first block of data comprising a first identifier and a second identifier, the first identifier corresponding to the predetermined duration and the second identifier determined from at least a running clock.

At 2008, a second block of data is identified. In at least one embodiment, a second block of data may comprise additional metric data, stored in the computer-implemented storage, the second block of data comprising a third identifier corresponding to the predetermined duration and a fourth identifier determined from at least the running clock.

At 2010, the first and second blocks of data are merged. In at least one embodiment, this merging may be based on an evaluation of at least the first identifier and the fourth identifier, merging of the first and second blocks of data generating a third block of data that is stored in the nonvolatile memory.

At 2012, one or more queries against the fourth block of data are processed.

In at least one embodiment, the third block of data comprises an amount of metric data less than the metric data of the first block of data and the additional metric data of the second block of data combined together. In at least one embodiment, subsequent to merging the first and second blocks of data to generate the third block of data, the first and second blocks of data are deleted from the nonvolatile computer-implemented storage. In at least one embodiment, the evaluation of the second identifier and the fourth identifier comprises determining a value of the fourth identifier divided by twice the predetermined duration is an integer value. In at least one embodiment, at least one query is answered by processing the third block of data. In at least one embodiment, data associated with the third block of data comprises metric data, the metric data comprising at least a plurality of metric values determined over a period of time. In at least one embodiment, merging the first and second blocks of data to generate the third block of data comprises determining the other value of the fourth identifier divided by twice the time period value equals an integer value.

Figure 21:
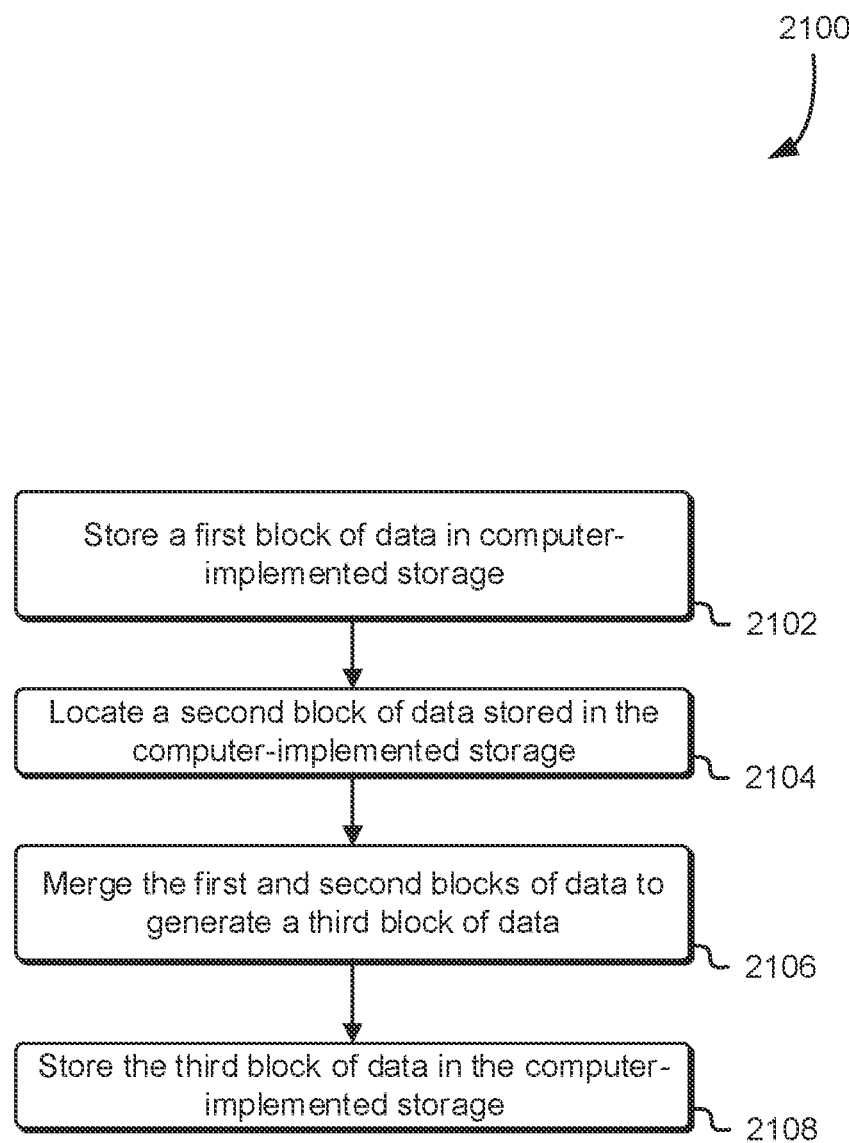
FIG. 21 illustrates an example flow diagram that may be associated with one or more of the described system environments to merge blocks of data, according to at least one embodiment.

FIG. 21 illustrates an example data flow diagram 2100 that may be associated with a one or more of the described system environments to store blocks in computer-implemented storage and merge the blocks, according to at least one embodiment. In some implementations, the acts of the flow diagram 2100 are executed by one or more computing devices of the example system environments described herein. The example system environments may execute computer-executable instructions incorporating at least some of the processing acts of the flow diagram 2100 to store blocks in computer-implemented storage and merge the blocks according to at least one of the embodiments described herein. These operations can also be performed in a different order than those described herein. It should also be understood that the methods described herein can be ended at any time and need not be performed in their entireties.

At 2102, a first block of data is stored in computer-implemented storage. In at least one embodiment, the first block of data may comprise an associated first identifier and second identifier. In at least one embodiment, the first identifier may comprise a time period value. In at least one embodiment, the second identifier may comprise a value determined from at least a running clock.

At 2104, a second block of data stored is located in the computer-implemented storage. In at least one embodiment, the second block of data may comprise an associated third identifier and fourth identifier. The third identifier may comprise the time period value. In at least one embodiment, the fourth identifier may comprise another value determined from at least the running clock.

At 2106, the first and second blocks of data are merged to generate a third block of data based on at least the time period value and the other value.

At 2108, the third block of data is stored in the computer-implemented storage.

In at least one embodiment, the computer-executable instructions that are executable by the one or more processors further cause the system to answer at least one query by processing the third block of data. In at least one embodiment, data associated with the third block of data comprises metric data, the metric data comprising at least a plurality of metric values determined over a period of time. In at least one embodiment, merging the first and second blocks of data to generate the third block of data comprises determining the other value of the fourth identifier divided by twice the time period value equals an integer value. In at least one embodiment, the time period value is a predetermined time period value that is a configurable time period in seconds. In at least one embodiment, the running clock is epoch UNIX time. In at least one embodiment, subsequent to merging the first and second blocks of data to generate the third block of data, the first and second blocks of data are deleted. In at least one embodiment, the first block of data is generated in volatile computer-implemented storage prior to storing the first block of data in the computer-implemented storage.

Figure 22:
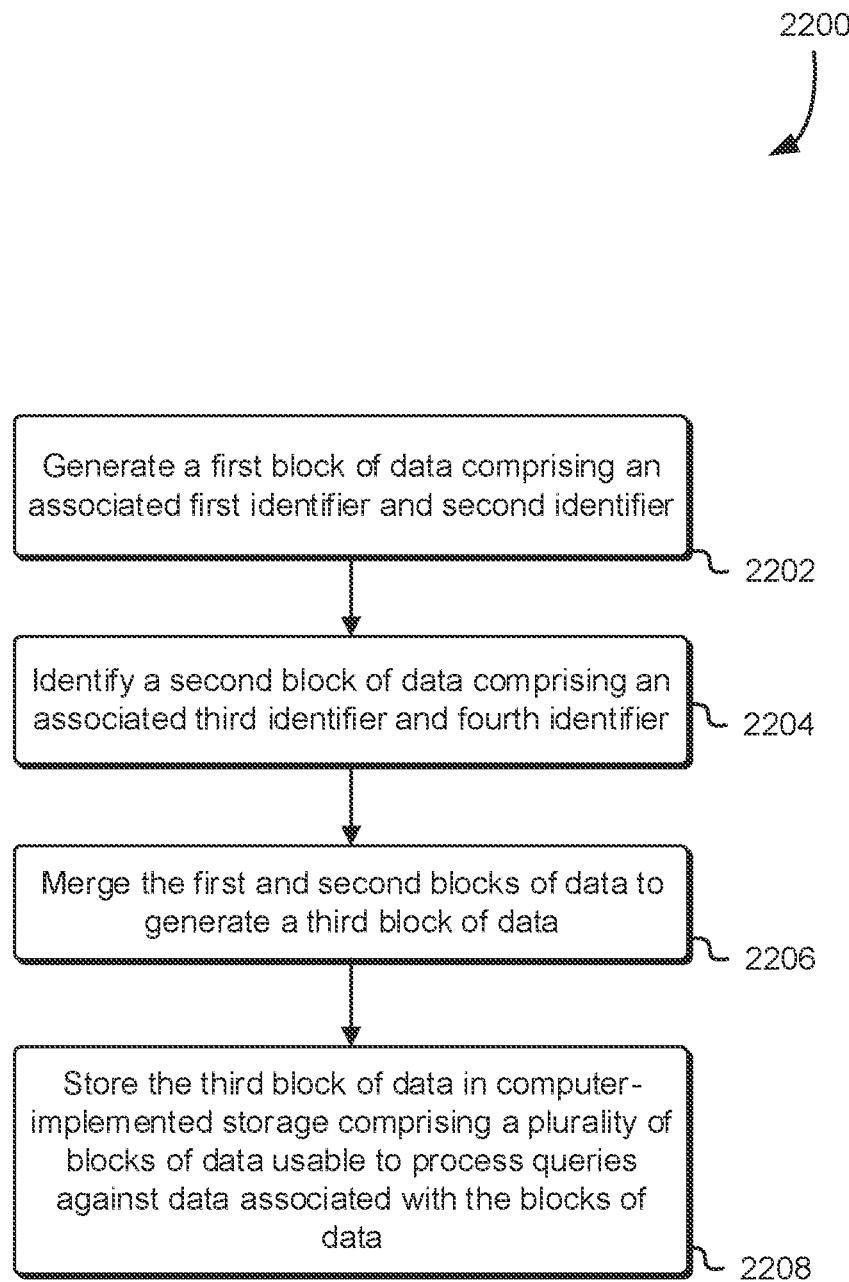
FIG. 22 illustrates an example flow diagram that may be associated with one or more of the described system environments to merge blocks data, according to at least one embodiment.

FIG. 22 illustrates an example data flow diagram 2200 that may be associated with a one or more of the described system environments to store blocks in computer-implemented storage comprising a plurality of blocks of data usable to process queries against data associated with the blocks of data and merge the blocks, according to at least one embodiment. In some implementations, the acts of the flow diagram 2200 are executed by one or more computing devices of the example system environments described herein. The example system environments may execute computer-executable instructions incorporating at least some of the processing acts of the flow diagram 2200 to store blocks in computer-implemented storage comprising a plurality of blocks of data usable to process queries against data associated with the blocks of data and merge the blocks according to at least one of the embodiments described herein. These operations can also be performed in a different order than those described herein. It should also be understood that the methods described herein can be ended at any time and need not be performed in their entireties.

At 2202, a first block of data is generated. In at least one embodiment, a first block of data may comprise an associated first identifier and second identifier. The first identifier may comprise a time period value. The second identifier may comprise a value determined from at least a running clock.

At 2204, a second block of data is identified. The second block of data may comprise an associated third identifier and fourth identifier. In at least one embodiment, the third identifier may comprise the time period value. In at least one embodiment, the fourth identifier may comprise another value determined from at least the running clock.

At 2206, the first and second blocks of data are merged to generate a third block of data based on at least the time period value and the other value.

At 2208, the third block of data is stored in computer-implemented storage comprising a plurality of blocks of data usable to process queries against data associated with the blocks of data.

In at least one embodiment, the executable instructions that, as a result of being executed by the one or more processors of the computer system, further cause the computer system to respond to at least one query by processing the third block of data. In at least one embodiment, data associated with the third block of data comprises metric data, the metric data comprising at least a plurality of metric values determined over a period of time. In at least one embodiment, merging the first and second blocks of data to generate the third block of data comprises determining the other value of the fourth identifier divided by twice the time period value equals an integer value. In at least one embodiment, the time period value is a configurable predetermined time period value in seconds. In at least one embodiment, the running clock is epoch UNIX time. In at least one embodiment, the executable instructions that, as a result of being executed by the one or more processors of the computer system, further cause the computer system to, subsequent to merging the first and second blocks of data to generate the third block of data, delete the first and second blocks of data. In at least one embodiment, the executable instructions that, as a result of being executed by the one or more processors of the computer system, further cause the computer system to generate the first block of data in volatile computer-implemented storage and then store the first block of data in nonvolatile computer-implemented storage.

Figure 23:
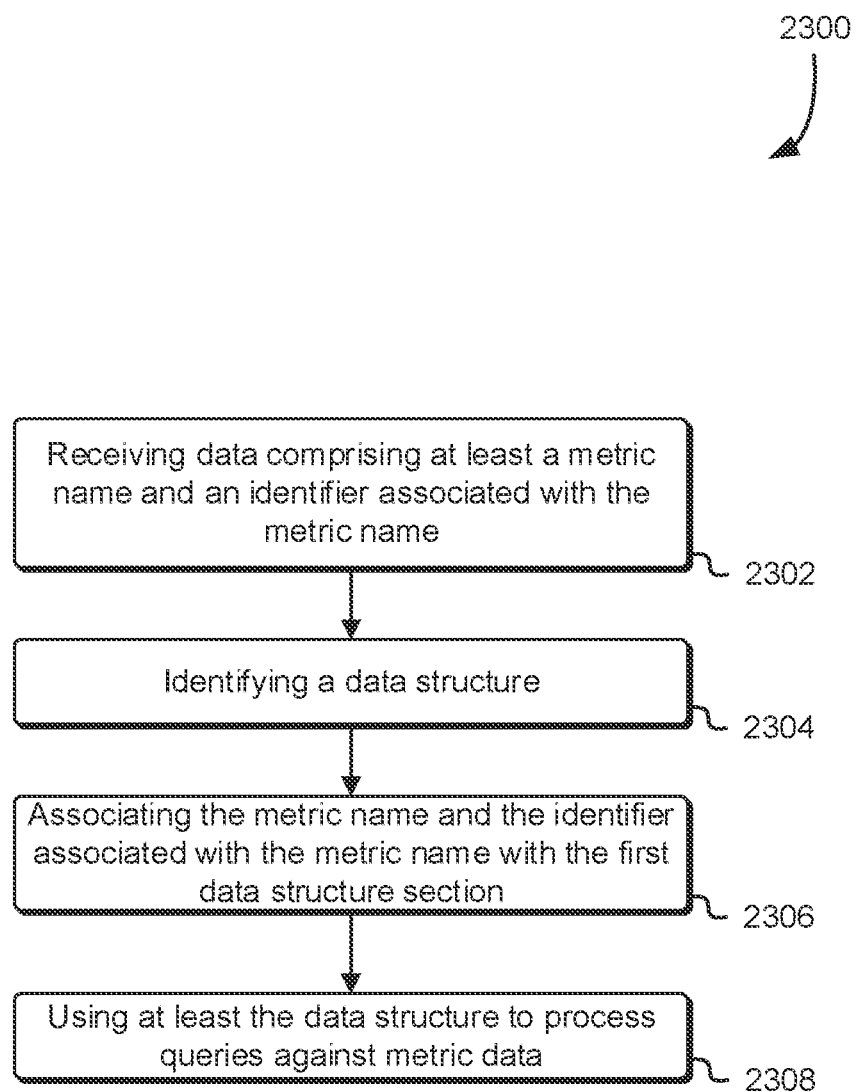
FIG. 23 illustrates an example flow diagram that may be associated with one or more of the described system environments to augment and/or generate a data structure, according to at least one embodiment.

FIG. 23 illustrates an example data flow diagram 2300 that may be associated with a one or more of the described system environment to receive data comprising at least a metric name and an identifier associated with the metric name and using at least the data structure to process queries against metric data hosted by computer-implemented storage, according to at least one embodiment. In some implementations, the acts of the flow diagram 2300 are executed by one or more computing devices of the example system environments described herein. The example system environments may execute computer-executable instructions incorporating at least some of the processing acts of the flow diagram 2300 to receive data comprising at least a metric name and an identifier associated with the metric name and using at least the data structure to process queries against metric data hosted by computer-implemented storage according to at least one of the embodiments described herein. These operations can also be performed in a different order than those described herein. It should also be understood that the methods described herein can be ended at any time and need not be performed in their entireties.

At 2302, data comprising at least a metric name and an identifier associated with the metric name is received.

At 2304, a data structure is identified. In at least one embodiment, the data structure comprises a first data structure section and a second data structure section. In at least one embodiment, a first data structure section may comprise at least a plurality of symbols determined from metric metadata and a plurality of offset pointers linked to the plurality of symbols comprised in the first data structure section. In at least one embodiment, the second data structure section may comprise of metric metadata represented by a plurality of pointers to symbols in the first data structure.

At 2306, the metric name and the identifier associated with the metric name with the first data structure section are associated. In at least one embodiment, the association may be completed by adding a first symbol representing the metric name to the first data structure and a second symbol representing the identifier to the first data structure, and adding a first offset value corresponding to the metric name and a second offset value corresponding to the identifier to the first data structure; adding a plurality of pointers to the second data structure that reference at least a plurality of symbols including the first and second symbols.

At 2308, queries against metric data hosted by computer-implemented storage, based on one or more binary searches of the data structure, may be processed using at least the data structure.

In at least one embodiment, wherein the identified data structure further comprises a third data structure section comprising table of content data identifying the first data structure section and the second data structure section, the table of content data at least comprising a first pointer to the first data structure section and a second pointer to the second data structure section. In at least one embodiment, the identified data structure further comprises a third data structure section comprising a first index entry referencing at least a portion of the second data structure, the computer-implemented method further comprising adding a second index entry to the third data structure that references one or more pointers of the plurality of pointers added to the second data structure. In at least one embodiment, the first data structure section and the second data structure section each comprise a plurality of fields, each field of the plurality of fields allocated a predetermined maximum of bytes to store data.

Figure 24:
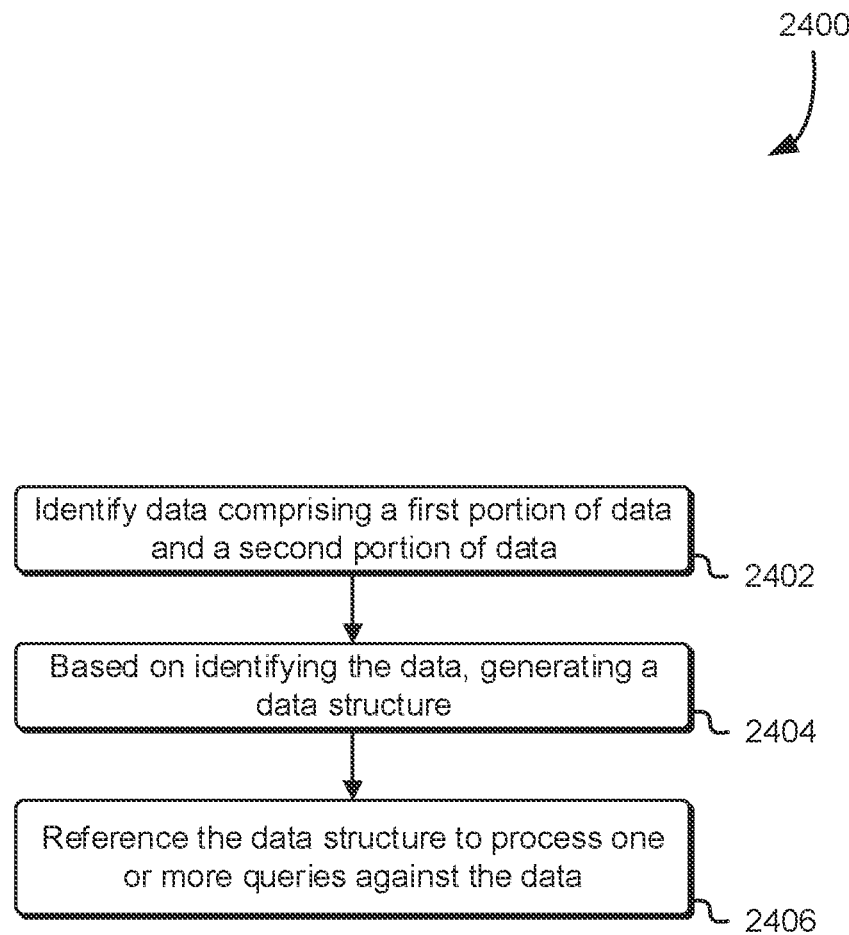
FIG. 24 illustrates an example flow diagram that may be associated with one or more of the described system environments to augment and/or generate a data structure, according to at least one embodiment.

FIG. 24 illustrates an example data flow diagram 2400 that may be associated with a one or more of the described system environments to identify data comprising a first portion of data and a second portion of data to generating a data structure used to process one or more queries against the data, according to at least one embodiment. In some implementations, the acts of the flow diagram 2400 are executed by one or more computing devices of the example system environments described herein. The example system environments may execute computer-executable instructions incorporating at least some of the processing acts of the flow diagram 2400 to identify data comprising a first portion of data and a second portion of data to generating a data structure used to process one or more queries against the data according to at least one of the embodiments described herein. These operations can also be performed in a different order than those described herein. It should also be understood that the methods described herein can be ended at any time and need not be performed in their entireties.

At 2402, data comprising a first portion of data and a second portion of data is identified.

At 2404, based on identifying the data, a data structure is generated. In at least one embodiment, the data structure may comprise a first section comprising: a first symbol associated with the first portion of data and a second symbol associated with the second portion of data, and a first offset value corresponding to the first portion of data and a second offset value corresponding to the second portion of data. In at least one embodiment, the data structure may comprise a second section comprising of a plurality of pointers that reference at least a plurality of symbols including at least the first and second symbol.

At 2406, the data structure is referenced to process one or more queries against the data.

In at least one embodiment, generating the data structure further comprises generating a third section comprising table of content data identifying the first section and the second section of the data structure. In at least one embodiment, the third section comprises a first pointer to the first section and a second pointer to the second section. In at least one embodiment, the data comprises metric data, the first portion of data comprises a metric name corresponding to a monitored computer resource of the system, and the second portion of data comprises a customer account identifier linked to the metric name. In at least one embodiment, the first section comprises a plurality of fields, each field of the plurality of fields capable of storing a predetermined maximum of bytes of data, and wherein a first field of the plurality of fields includes the first offset value and the second field of the plurality of fields includes the second offset value. In at least one embodiment, the first symbol comprises an encoded representation of the first portion of data and the second system comprises an encoded representation of the second portion of data.

Figure 25:
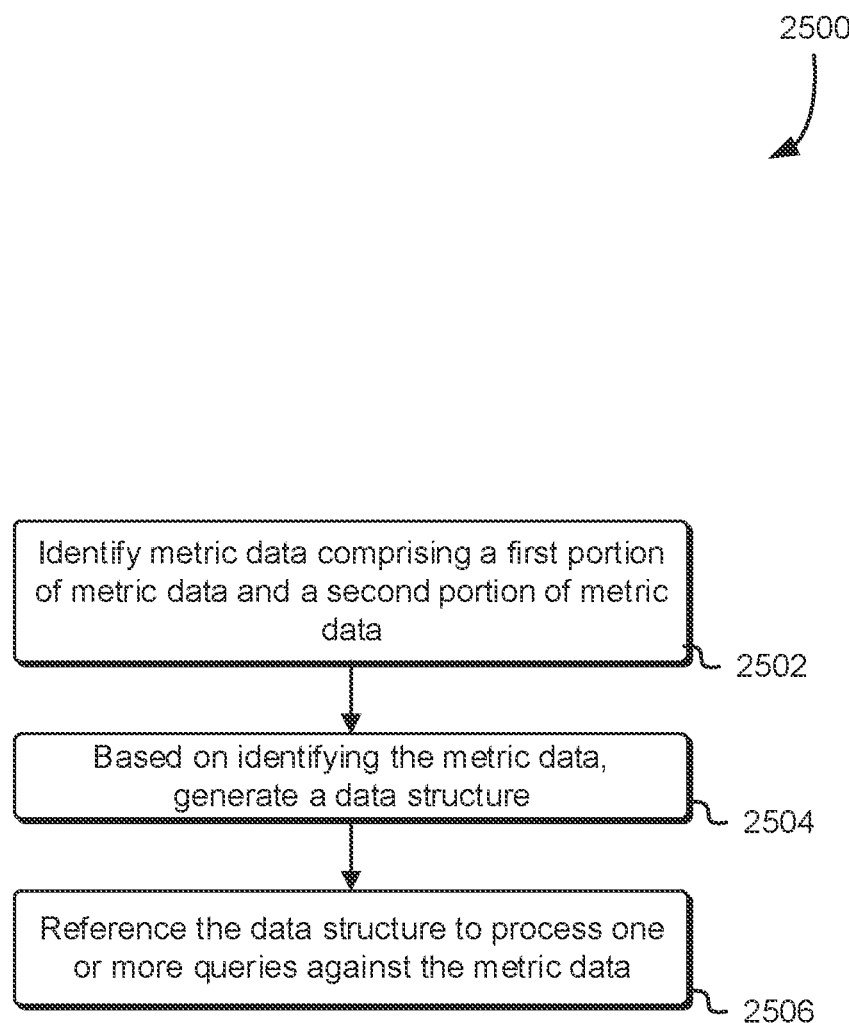
FIG. 25 illustrates an example flow diagram that may be associated with one or more of the described system environments to generate a data structure, according to at least one embodiment.

FIG. 25 illustrates an example data flow diagram 2500 that may be associated with a one or more of the described system environments to identify metric data comprising a first portion of metric data and a second portion of metric data to generate a data structure and process one or more queries against the metric data, according to at least one embodiment. In some implementations, the acts of the flow diagram 2500 are executed by one or more computing devices of the example system environments described herein. The example system environments may execute computer-executable instructions incorporating at least some of the processing acts of the flow diagram 2500 to identify metric data comprising a first portion of metric data and a second portion of metric data to generate a data structure and process one or more queries against the metric data according to at least one of the embodiments described herein. These operations can also be performed in a different order than those described herein. It should also be understood that the methods described herein can be ended at any time and need not be performed in their entireties.

At 2502, metric data comprising a first portion of metric data and a second portion of metric data is identified.

At 2504, based on identifying the metric data, a data structure is generated. The data structure may comprise a first section and a second section. The first section may comprise a first symbol comprising the first portion of metric data and a second symbol comprising the second portion of metric data, and a first offset value corresponding to the first portion of metric data and a second offset value corresponding to the second portion of metric data. The second section may comprise a plurality of pointers that reference at least a plurality of symbols associated of the first section, the plurality of symbols at least comprising the first symbol and the second symbol.

At 2506, the data structure is referenced to process one or more queries against the metric data.

In at least one embodiment, generating the data structure further comprises generating a third section referencing at least a portion of the second section. In at least one embodiment, the third section comprises an index entry that references one or more pointers of the plurality of pointers of the second section. In at least one embodiment, generating the data structure further comprises generating a third section comprising table of content data identifying the first section and the second section of the data structure. In at least one embodiment, the third section comprises a first pointer to the first section and a second pointer to the second section. In at least one embodiment, the first portion of metric data comprises a metric name corresponding to a monitored computer resource of the system, and the second portion of metric data comprises a customer account identifier linked to the metric name. In at least one embodiment, the first section comprises a plurality of fields, each field of the plurality of fields capable of storing a predetermined maximum of bytes of data, and wherein first field of the plurality of fields includes the first offset value and the second field of the plurality of fields includes the second offset value. In at least one embodiment, the first symbol comprises an encoded representation of the first portion of data and the second system comprises an encoded representation of the second portion of data.

Figure 26:
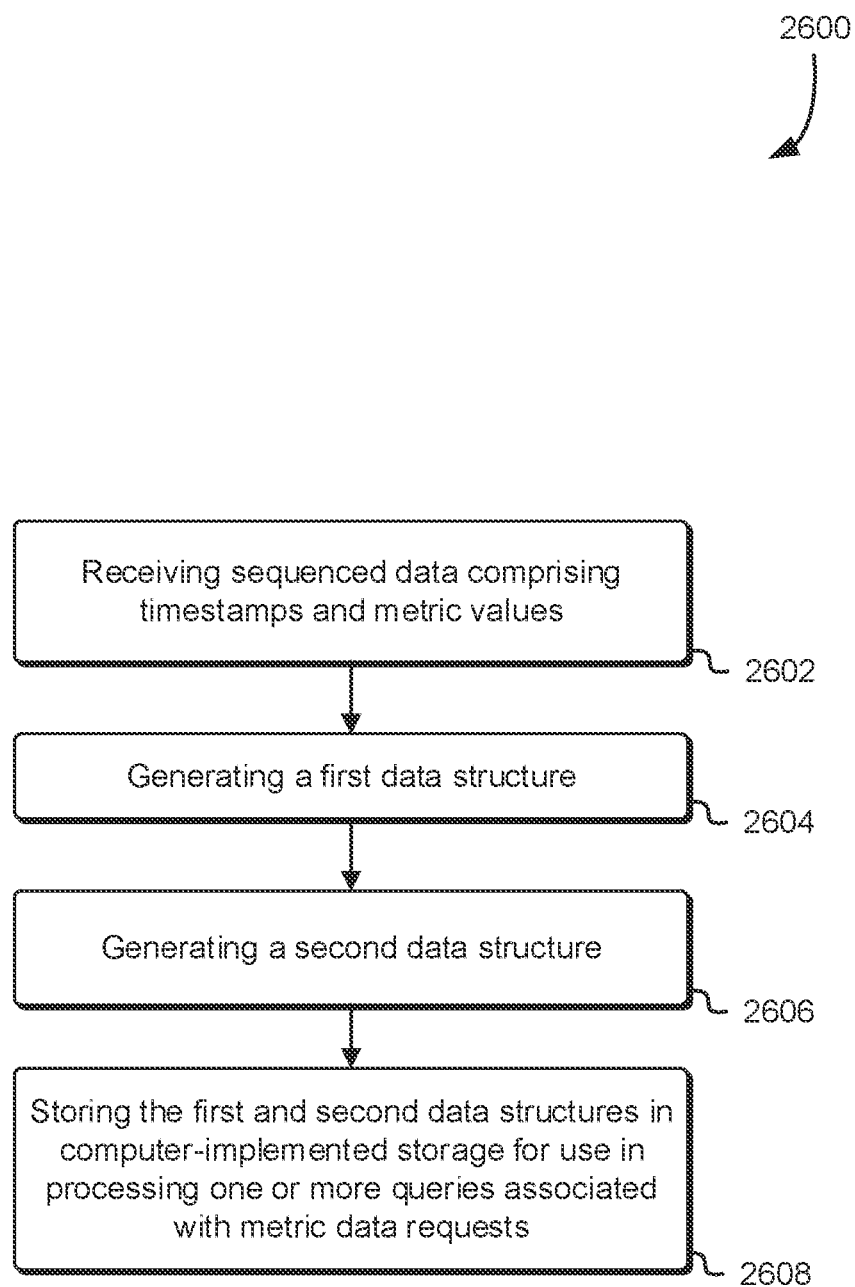
FIG. 26 illustrates an example flow diagram that may be associated with one or more of the described system environments to generate a data structure, according to at least one embodiment.

FIG. 26 illustrates an example data flow diagram 2600 that may be associated with a one or more of the described system environments for storing the first and second data structures in computer-implemented storage for use in processing one or more queries associated with metric data requests, according to at least one embodiment. In some implementations, the acts of the flow diagram 2600 are executed by one or more computing devices of the example system environments described herein. The example system environments may execute computer-executable instructions incorporating at least some of the processing acts of the flow diagram 2600 to store the first and second data structures in computer-implemented storage for use in processing one or more queries associated with metric data requests according to at least one of the embodiments described herein. These operations can also be performed in a different order than those described herein. It should also be understood that the methods described herein can be ended at any time and need not be performed in their entireties.

At 2602, sequenced data comprising timestamps and metric values is received, each timestamp of the timestamps associated with a metric value comprised in the metric values.

At 2604, a first data structure is generated. The first data structure may identify a first timestamp of the timestamps, a first value identifying a time duration between successive timestamps of the timestamps, and a second value identifying a total number of timestamps comprised in the sequenced data.

At 2606, a second data structure is generated. The second data structure may comprise a first metric value of the metric values. Alternatively, the second data structure generated may comprise a single metric value corresponding to the first metric value of the metric values when analysis of the metric values indicates all metric values are equal. Alternatively, the second data structure generated may comprise the first metric value from the metric values and an additional value determined from comparing a second metric value of the metric values to the first metric value when the analysis of the metric values indicates the metric values comprise at least a plurality of different values.

At 2608, the first and second data structures are stored in computer-implemented storage for use in processing one or more queries associated with metric data requests.

At least one embodiment, the second data structure is generated to include the first metric value from the metric values and the additional value, and wherein the additional value is an integer value increment corresponding to how much greater than or less than the second metric value is compared to the first metric value. In at least one embodiment, in an additional act, the first data structure and the second data structure are merged to generate a merged data structure representing the sequenced data, the merged data structure analyzable to determine the timestamps and the metric values comprised in the sequenced data. In at least one embodiment, the first data structure comprises a plurality of fields each individually capable of storing a predetermined maximum of data.

Figure 27:
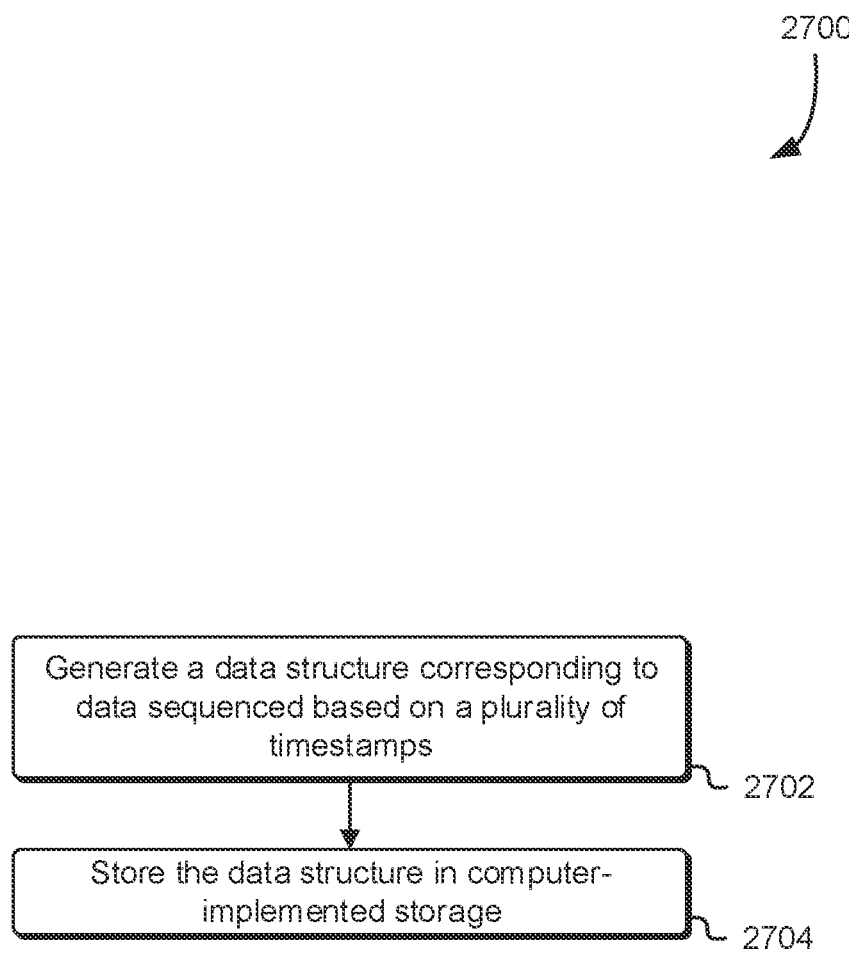
FIG. 27 illustrates an example flow diagram that may be associated with one or more of the described system environments to generate a data structure, according to at least one embodiment.

FIG. 27 illustrates an example data flow diagram 2700 that may be associated with a one or more of the described system environments for generating a data structure and storing the structure in computer-implemented storage, according to at least one embodiment. In some implementations, the acts of the flow diagram 2700 are executed by one or more computing devices of the example system environments described herein. The example system environments may execute computer-executable instructions incorporating at least some of the processing acts of the flow diagram 2700 for generating a data structure and storing the structure in computer-implemented storage according to at least one of the embodiments described herein. These operations can also be performed in a different order than those described herein. It should also be understood that the methods described herein can be ended at any time and need not be performed in their entireties.

At 2702, a data structure corresponding to data sequenced based on a plurality of timestamps is generated. The data structure may comprise at least a first section and a second section. The first section may identify a first timestamp associated with the plurality of timestamps and a number representing how many timestamps are associated with the plurality of timestamps. The second section may comprise at least a value, associated with the data and linked to the first timestamp, and an additional value representing an encoding type associated with the second section.

At 2704, the data structure is stored in computer-implemented storage.

In at least one embodiment, the data sequenced based on the plurality of timestamps comprises metric data generated from analysis of computer resources of an online service provider. In at least one embodiment, the second section of the data structure comprises a plurality of values associated with the data, each value of the plurality of values corresponding to a timestamp of the plurality of timestamps, and wherein the second value representing the encoding type is determined based on analysis of the plurality of values. In at least one embodiment, the second section of the data structure comprises a single value, associated with the data and linked to the first timestamp, and the second value representing the encoding type determined based on analysis of the plurality of values. In at least one embodiment, the second section of the data structure comprises a plurality of values associated with the data, the plurality values associated the data comprising the first value, associated with the data and linked to the first timestamp, and a plurality of additional values derived from the plurality values, excluding the first value, and wherein the second value representing the encoding type is determined based on analysis of the plurality of values. In at least one embodiment, the additional value representing the encoding type is associated with a portion of the second section capable of holding a maximum of one byte of data.

Other byte values can be used and/or the byte value can be configurable. In at least one embodiment, the first value comprised in the second section is associated with a portion of the second section capable of holding a maximum of four bytes of data or eight bytes of data. In at least one embodiment, the first section further comprises a second number identifying a time duration between successive timestamps of the plurality of timestamps. Other byte values can be used and/or the byte values can be configurable.

Figure 28:
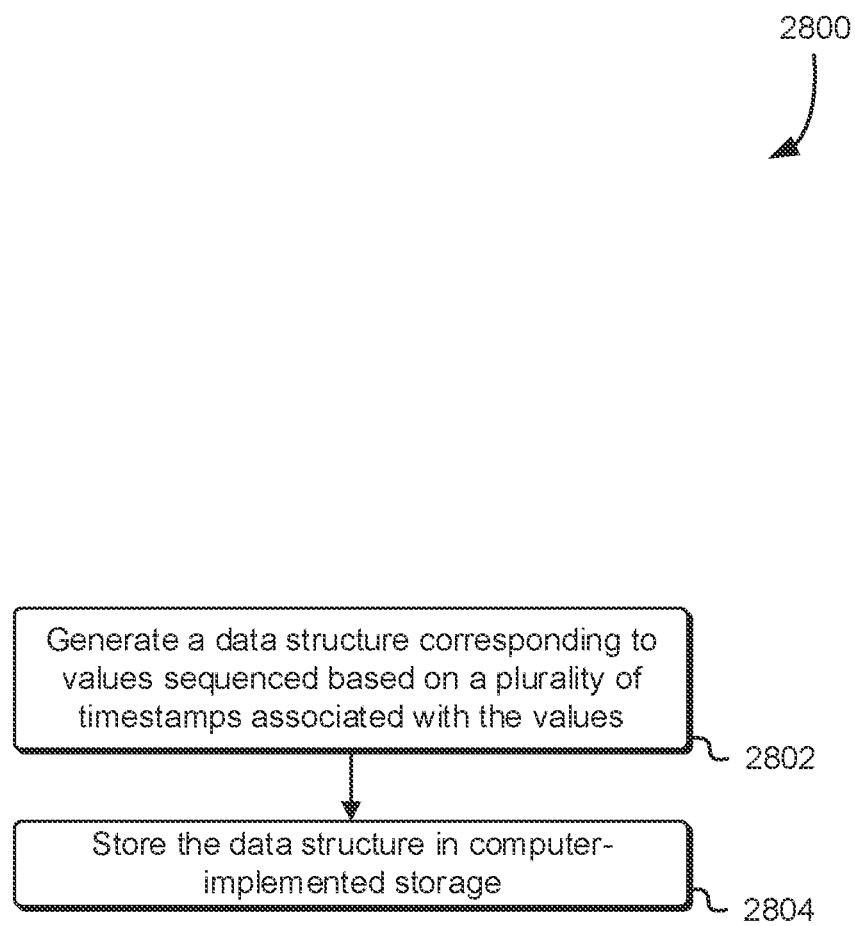
FIG. 28 illustrates an example flow diagram that may be associated with one or more of the described system environments to generate a data structure, according to at least one embodiment.

FIG. 28 illustrates an example data flow diagram 2800 that may be associated with a one or more of the described system environments for generating a data structure and storing the structure in computer-implemented storage, according to at least one embodiment. In some implementations, the acts of the flow diagram 2800 are executed by one or more computing devices of the example system environments described herein. The example system environments may execute computer-executable instructions incorporating at least some of the processing acts of the flow diagram 2800 for generating a data structure and storing the structure in computer-implemented storage according to at least one of the embodiments described herein. These operations can also be performed in a different order than those described herein. It should also be understood that the methods described herein can be ended at any time and need not be performed in their entireties.

At 2802, a data structure corresponding to values sequenced based on a plurality of timestamps associated with the values is generated. The data structure may comprise at least a first section and a second section. The first section may identify a first timestamp associated with the plurality of timestamps and a number representing how many timestamps are associated with the plurality of timestamps. The second section may comprise at least a value linked to the first timestamp, and an additional value representing an encoding type associated with the second section.

At 2804, the data structure is stored in computer-implemented storage.

In at least one embodiment, additional acts can be processed. For example, one or more queries can be processed against the values sequenced based on the plurality of timestamps, the values sequenced based on the plurality of timestamps determined from analysis of the data structure stored in the computer-implemented storage. In at least one embodiment, the second section of the data structure comprises a plurality of values associated with the data, each value of the plurality of values each corresponding to a timestamp of the plurality of timestamps, and wherein the second value representing the encoding type is determined based on analysis of the values. In at least one embodiment, the second section of the data structure comprises a single value associated with the first timestamp, and the second value representing the encoding type is determined based on analysis of the values. In at least one embodiment, the second value representing the encoding type is associated with a portion of the second section capable of holding a maximum of one byte of data. In at least one embodiment, the first value comprised in the second section is associated with a portion of the second section capable of holding a maximum of four bytes of data or eight bytes of data. In at least one embodiment, the first section further comprises a second number identifying a time duration between successive timestamps of the plurality of timestamps. In at least one embodiment, the values sequenced based on a plurality of timestamps comprise metric data generated from analysis of computer resources of an online service provider. Other byte values can be used and/or the byte values can be configurable.

Figure 29:
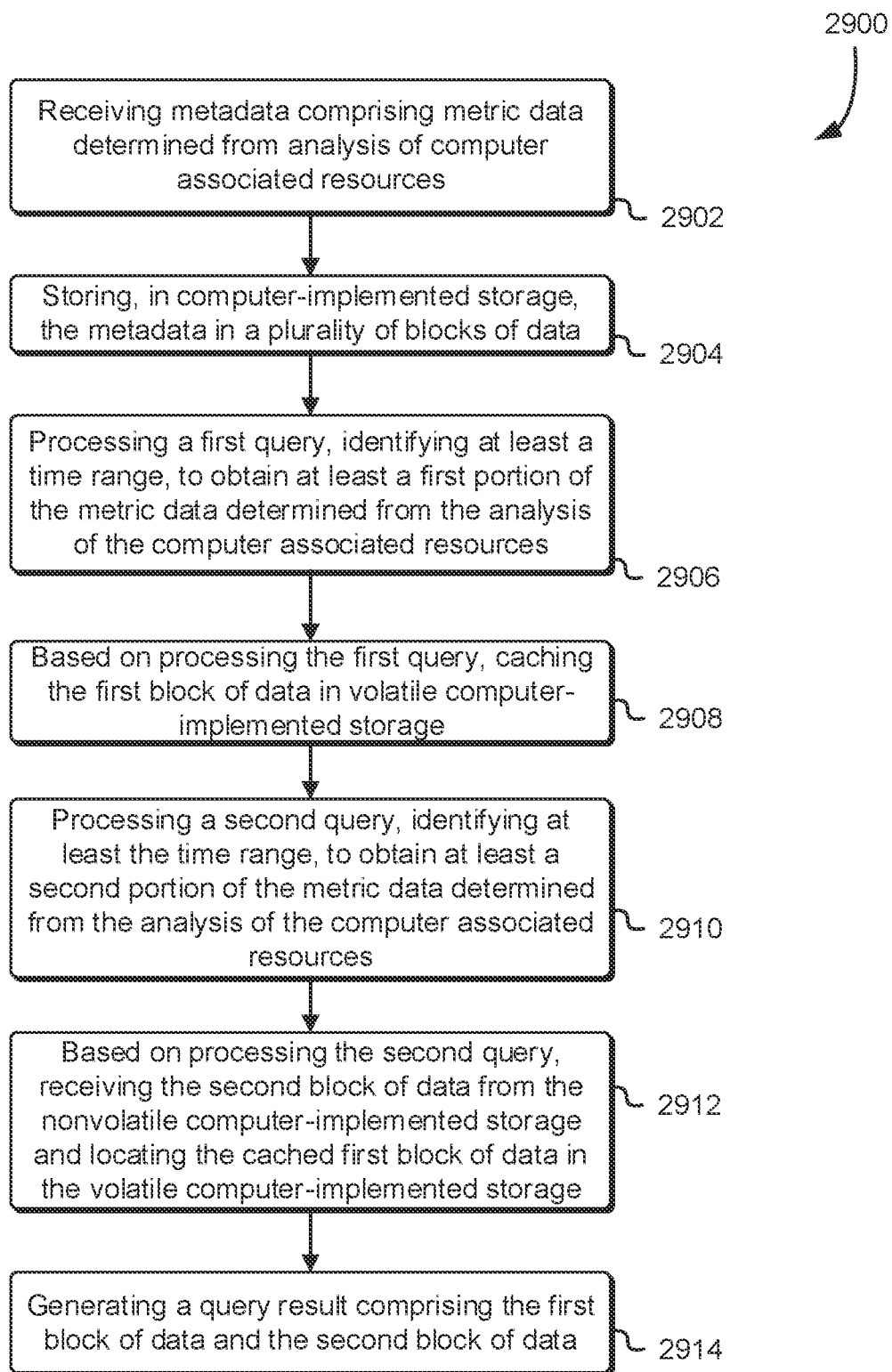
FIG. 29 illustrates an example data flow diagram that may be associated with a one or more of the described system environments for caching metadata and processing queries against the cached metadata and metadata stored in non-volatile computer-implemented storage, according to at least one embodiment.

FIG. 29 illustrates an example data flow diagram 2900 that may be associated with a one or more of the described system environments for caching metadata and processing queries against the cached metadata and metadata stored in nonvolatile computer-implemented storage, according to at least one embodiment. In some implementations, the acts of the flow diagram 2900 are executed by one or more computing devices of the example system environments described herein. The example system environments may execute computer-executable instructions incorporating at least some of the processing acts of the flow diagram 2900 for caching metadata and processing queries against the cached metadata and metadata stored in nonvolatile computer-implemented storage, according to at least one embodiment. These operations can also be performed in a different order than those described herein. It should also be understood that the methods described herein can be ended at any time and need not be performed in their entireties.

At 2902, metadata comprising metric data determined from analysis of computer associated resources is received.

At 2904, metadata in a plurality of blocks of data is stored in computer-implemented storage.

At 2906, a first query, identifying at least a time range, is processed to obtain at least a first portion of the metric data determined from the analysis of the computer associated resources, the first portion of the metric data comprised in a first block of data of the plurality of blocks of data stored in nonvolatile computer-implemented storage, the first block of data comprising a first timestamp value at least based on a running clock and associated with the time range.

At 2908, based on processing the first query, the first block of data is cached in volatile computer-implemented storage.

At 2910, a second query, identifying at least the time range, is processed to obtain at least a second portion of the metric data determined from the analysis of the computer associated resources, the second portion of the metric data comprised in a second block of data of the plurality of blocks of data stored in the nonvolatile computer-implemented storage and the first block of data, the second block of data comprising a second timestamp value at least based on the running clock and associated with the time range.

At 2912, based on processing the second query, the second block of data is received from the nonvolatile computer-implemented storage and locating the cached first block of data in the volatile computer-implemented storage.

At 2914, a query result is generated comprising the first block of data and the second block of data.

Additional acts can also be processed. For example, in at least one embodiment, additional acts can include receiving the second query identifying the time range, and analyzing cached blocks of data to locate the first block of data based on the time range of the second query and the first timestamp value of the first block of data, and wherein processing the second query comprises generating a data request message comprising information identifying the first block of data. The information identifying the first block of data comprises the first timestamp value and a value generated based on a predetermined data retention parameter used to generate the plurality of blocks of data, and an identifier of the nonvolatile computer-implemented storage comprising the first block of data, the value, the first timestamp value, and the identifier of the nonvolatile computer-implemented storage comprised in metadata of the first block of data. Furthermore, in at least one embodiment, caching the first block of data comprises allocating the first block of data to a portion of cache corresponding to the first timestamp value of the first block of data, and the method further comprising caching the second block of data, based on the second timestamp value of the second block of data, in the portion of cache comprising the first block of data.

Figure 30:
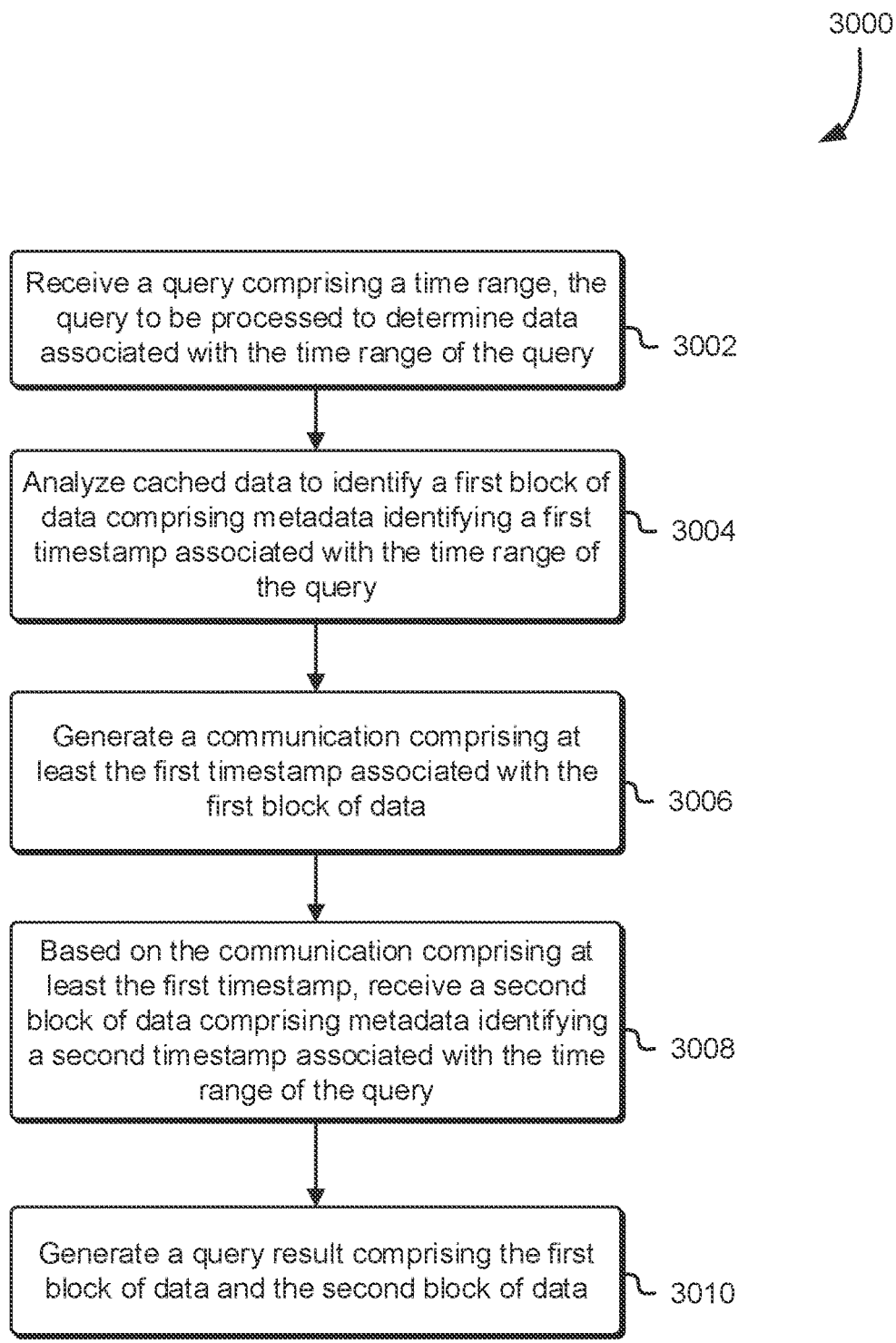
FIG. 30 illustrates an example data flow diagram that may be associated with a one or more of the described system environments for caching metadata and processing queries against the cached metadata and metadata stored in non-volatile computer-implemented storage, according to at least one embodiment.
Figure 31:
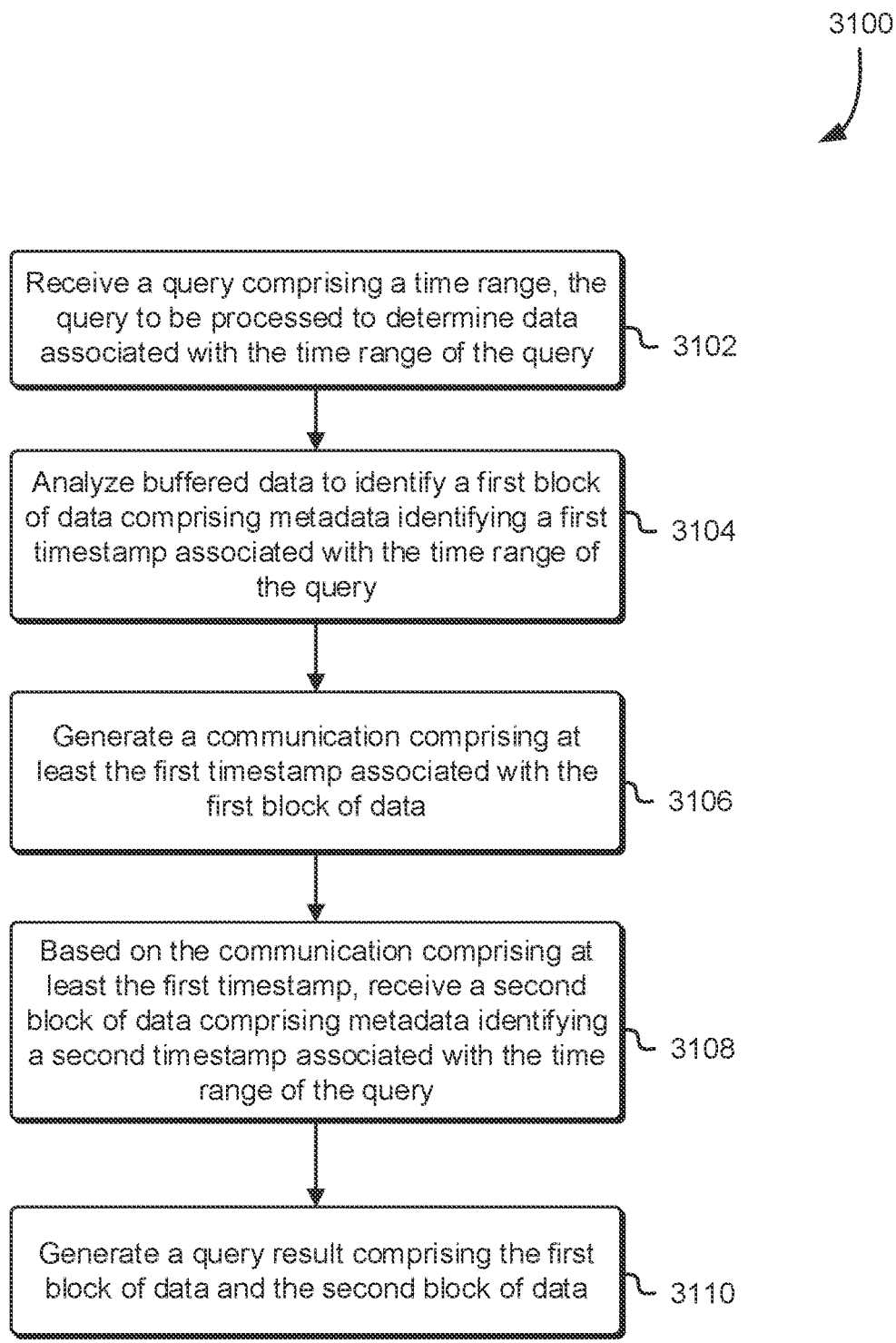
FIG. 31 illustrates an example data flow diagram that may be associated with a one or more of the described system environments for caching metadata and processing queries against the cached metadata and metadata stored in non-volatile computer-implemented storage, according to at least one embodiment.

FIG. 30 illustrates an example data flow diagram 3000 that may be associated with a one or more of the described system environments for caching metadata and processing queries against the cached metadata and metadata stored in nonvolatile computer-implemented storage, according to at least one embodiment. In some implementations, the acts of the flow diagram 3000 are executed by one or more computing devices of the example system environments described herein.

The example system environments may execute computer-executable instructions incorporating at least some of the processing acts of the flow diagram 3000 for caching metadata and processing queries against the cached metadata and metadata stored in nonvolatile computer-implemented storage, according to at least one embodiment. These operations can also be performed in a different order than those described herein. It should also be understood that the methods described herein can be ended at any time and need not be performed in their entireties.

At 3002, receive a query comprising a time range, the query to be processed to determine data associated with the time range of the query.

At 3004, analyze cached data to identify a first block of data comprising metadata identifying a first timestamp associated with the time range of the query.

At 3006, generate a communication comprising at least the first timestamp associated with the first block of data.

At 3008, based on the communication comprising at least the first timestamp, receive a second block of data comprising metadata identifying a second timestamp associated with the time range of the query.

At 3010, generate a query result comprising the first block of data and the second block of data.

Additional acts can also be processed. For example, in at least one embodiment, additional acts can include merging the first block of data and the second block of data to generate a third block of data; associating the third block of data with the cached data; and removing the first block of data and second block of data from the cached data. Furthermore, in at least one embodiment, the additional acts can include analyzing the metadata of the first block of data and metadata of the second block of data to identify a time period value shared by the first block of data and the second block of data; and based on determining the time period value is shared by the first block of data and the second block of data, merging the first block of data and the second block of data to generate the third block of data and removing the first block of data from the cached data.

FIG. 30 illustrates an example data flow diagram 3000 that may be associated with a one or more of the described system environments for caching metadata and processing queries against the cached metadata and metadata stored in nonvolatile computer-implemented storage, according to at least one embodiment. In some implementations, the acts of the flow diagram 3000 are executed by one or more computing devices of the example system environments described herein. The example system environments may execute computer-executable instructions incorporating at least some of the processing acts of the flow diagram 3000 for caching metadata and processing queries against the cached metadata and metadata stored in nonvolatile computer-implemented storage, according to at least one embodiment. These operations can also be performed in a different order than those described herein. It should also be understood that the methods described herein can be ended at any time and need not be performed in their entireties.

At 3102, receive a query comprising a time range, the query to be processed to determine data associated with the time range of the query.

At 3104, analyze buffered data to identify a first block of data comprising metadata identifying a first timestamp associated with the time range of the query.

At 3106, generate a communication comprising at least the first timestamp associated with the first block of data.

At 3108, based on the communication comprising at least the first timestamp, receive a second block of data comprising metadata identifying a second timestamp associated with the time range of the query.

At 3110, generate a query result comprising the first block of data and the second block of data.

Additional acts can also be processed. For example, in at least one embodiment, additional acts can include merging the first block of data and the second block of data to generate a third block of data; associating the third block of data with the buffered data; and removing the first block of data and second block of data from the buffered data. Furthermore, in at least one embodiment, the additional acts can include analyzing the metadata of the first block of data and metadata of the second block of data to identify a time period value shared by the first block of data and the second block of data; and based on determining the time period value is shared by the first block of data and the second block of data, merging the first block of data and the second block of data to generate the third block of data and removing the first block of data from the buffered data.

Figure 32:
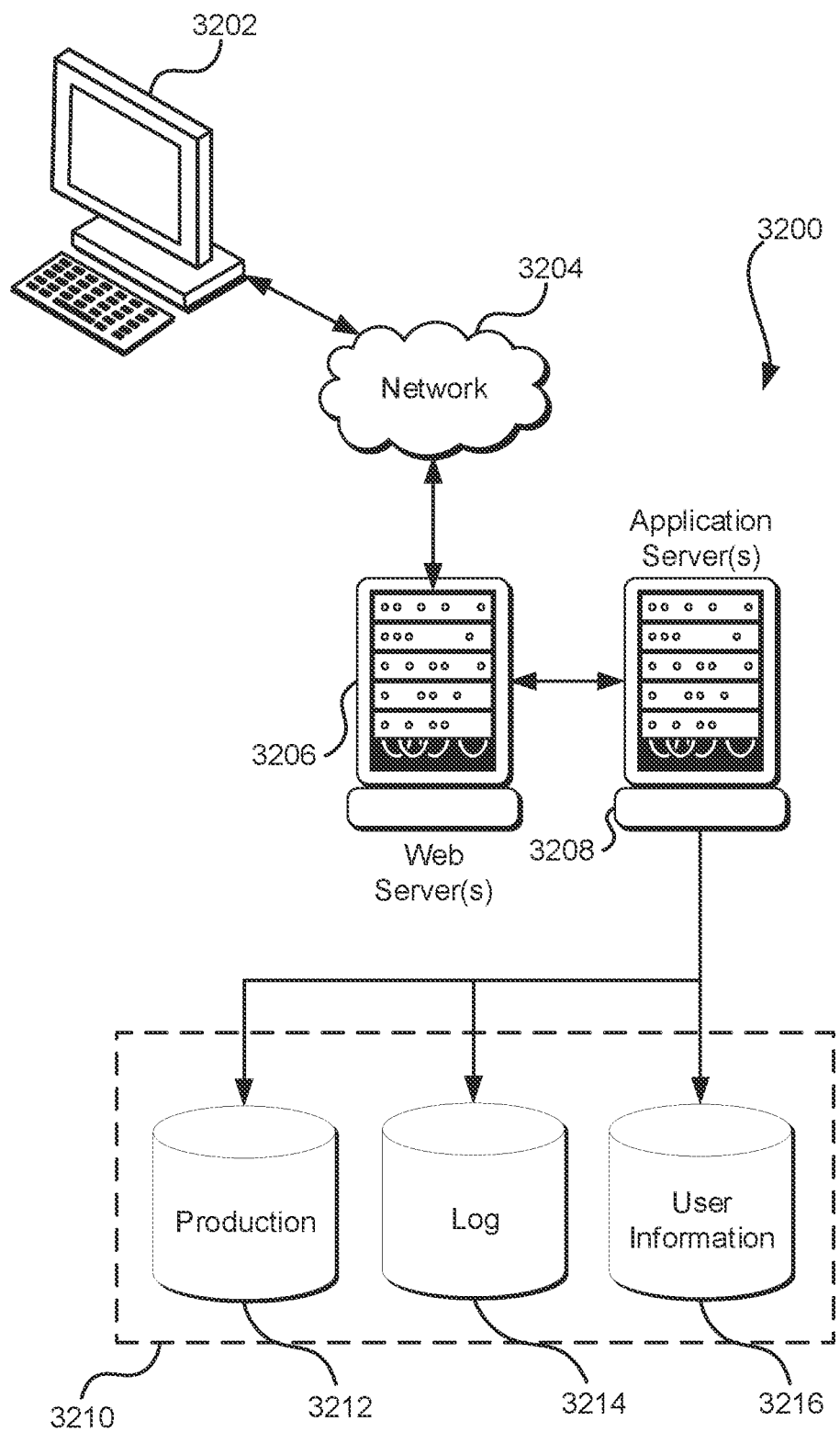
FIG. 32 illustrates a system in which various embodiments can be implemented.

FIG. 32 illustrates aspects of an example system 3200 for implementing aspects in accordance with an embodiment. As will be appreciated, although a web-based system is used for purposes of explanation, different systems may be used, as appropriate, to implement various embodiments. Any one or more of the systems, devices, resources, and so forth, illustrated in FIG. 32 and the other FIGS. referenced hereby can implement any one or more of the elements set forth in the recitation of the claims, including computer-implemented method claim recitation, system claim recitation, and/or computer-readable storage medium claim recitation, associated herewith. In an embodiment, the system includes an electronic client device 3202, which includes any appropriate device operable to send and/or receive requests, messages, or information over an appropriate network 3204 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 3206 for receiving requests and serving content in response thereto, although for other networks an alternative device serving a similar purpose could be used as would be apparent to one of ordinary skill in the art.

In an embodiment, the illustrative system includes at least one application server 3208 and a data store 3210, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 3202 and the application server 3208, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 3210, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 3212 and user information 3216, which are used to serve content for the production side. The data store also is shown to include a mechanism for storing log data 3214, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 3210.

The data store 3210, in an embodiment, is operable, through logic associated therewith, to receive instructions from the application server 3208 and obtain, update or otherwise process data in response thereto, and the application server 3208 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 3202. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 3200 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 3200, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 32. Thus, the depiction of the system 3200 in FIG. 32 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network. In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as JavaR, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood. however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A computer-implemented method, comprising:
    generating, by a computer-implemented agent, sequenced data comprising timestamps and metric values based, at least in part, on evaluation of data collected based on operation or use of one or more computer-implemented services;
    obtaining, by a computer-implemented module, the sequenced data comprising timestamps and metric values, each timestamp of the timestamps associated with a metric value comprised in the metric values;
    generating, by the computer-implemented module and from the obtained sequenced data, a first data structure identifying a first timestamp of the timestamps, a first value identifying a time duration between successive timestamps of the timestamps, a second value identifying a total number of timestamps comprised in the sequenced data, and a third value obtained from a difference calculation using successive at least two timestamps of the timestamps;
    generating, by the computer-implemented module and from the obtained sequenced data, a second data structure comprising a first metric value of the metric values, the second data structure generated to include a single metric value corresponding to the first metric value of the metric values when analysis of the metric values indicates all metric values are equal, or generating the second data structure to include the first metric value from the metric values and an additional value determined from comparing a second metric value of the metric values to the first metric value when the analysis of the metric values indicates the metric values comprise at least a plurality of different values;
    storing the first and second data structures in computer-implemented storage; and
    referencing the first and second data structures in computer-implemented storage to respond to one or more queries to locate one or more of the metric data generated based on the operation or the use of the one or more computer-implemented resources.

2. The computer-implemented method of claim 1, wherein the second data structure is generated to include the first metric value from the metric values and the additional value, and wherein the additional value is an integer value increment corresponding to how much greater than or less than the second metric value is compared to the first metric value.

3. The computer-implemented method of claim 1, further comprising merging the first data structure and the second data structure to generate a merged data structure representing the sequenced data, the merged data structure analyzable to determine the timestamps and the metric values comprised in the sequenced data.

4. The computer-implemented method of claim 1, wherein the first data structure comprises a plurality of fields each individually capable of storing a predetermined maximum of data.

5. A system, comprising:
    one or more processors; and
    memory that stores computer-executable instructions that are executable by the one or more processors to cause the system to:
        generate, by a computer-implemented agent, sequenced data comprising timestamps and metric values based, at least in part, on evaluation of data collected based on operation or use of one or more computer-implemented services;
        obtain, by a computer-implemented module, the sequenced data;
        generate, by the computer-implemented module and from the sequenced data, a data structure corresponding to the data sequenced based on the plurality of timestamps, the data structure comprising at least:
            a first section identifying a first timestamp associated with the plurality of timestamps, a first number representing how many timestamps are associated with the plurality of timestamps, and a second number determined based on a calculation performed using at least two successive timestamps of the plurality of timestamps; and
            a second section comprising at least a first value, associated with the data and linked to the first timestamp, and a second value representing an encoding type associated with the second section;
        store the data structure in computer-implemented storage; and
        reference the data structure to respond to one or more queries to locate one or more of the metric data generated based on the operation or the use of the one or more computer-implemented resources.

6. The system of claim 5, wherein the data sequenced based on the plurality of timestamps comprises metric data generated from analysis of computer resources of an online service provider.

7. The system of claim 5, wherein the second section of the data structure comprises a plurality of values associated with the data, each value of the plurality of values corresponding to a timestamp of the plurality of timestamps, and wherein the second value representing the encoding type is determined based on analysis of the plurality of values.

8. The system of claim 5, wherein the second section of the data structure comprises a single value, associated with the data and linked to the first timestamp, and the second value representing the encoding type determined based on analysis of the plurality of values.

9. The system of claim 5, wherein the second section of the data structure comprises a plurality of values associated with the data, the plurality values associated the data comprising the first value, associated with the data and linked to the first timestamp, and a plurality of additional values derived from the plurality values, excluding the first value, and wherein the second value representing the encoding type is determined based on analysis of the plurality of values.

10. The system of claim 5, wherein the additional value representing the encoding type is associated with a portion of the second section capable of holding a maximum of one byte of data.

11. The system of claim 5, wherein the first value comprised in the second section is associated with a portion of the second section capable of holding a maximum of four bytes of data or eight bytes of data.

12. The system of claim 5, wherein the first section further comprises a second number identifying a time duration between successive timestamps of the plurality of timestamps.

13. A non-transitory computer-readable storage medium storing thereon executable instructions that, as a result of being executed by one or more processors of a computer system, cause the computer system to:
  generate, by a computer-implemented agent, sequenced data comprising timestamps and metric values based, at least in part, on evaluation of data collected based on operation or use of one or more computer-implemented services;
  obtain, by a computer-implemented module, values sequenced;
  generate, by the computer-implemented module and from the sequenced values, a data structure corresponding to the values sequenced based on the plurality of timestamps, the data structure comprising at least:
    a first section identifying a first timestamp associated with the plurality of timestamps, a first number representing how many timestamps are associated with the plurality of timestamps, and a second number calculated using at least two successive timestamps of the plurality of timestamps; and
    a second section comprising at least a first value linked to the first timestamp, and a second value representing an encoding type associated with the second section;
  store the data structure in computer-implemented storage; and
  reference the data structure to respond to one or more queries to locate one or more of the values generated based on the operation or the use of the one or more computer-implemented resources.

14. The non-transitory computer-readable storage medium of claim 13, wherein the second section of the data structure comprises a plurality of values, each value of the plurality of values each corresponding to a timestamp of the plurality of timestamps, and wherein the second value representing the encoding type is determined based on analysis of the values.

15. The non-transitory computer-readable storage medium of claim 13, wherein the second section of the data structure comprises a single value associated with the first timestamp, and the second value representing the encoding type is determined based on analysis of the values.

16. The non-transitory computer-readable storage medium of claim 13, wherein the second value representing the encoding type is associated with a portion of the second section capable of holding a maximum of one byte of data.

17. The non-transitory computer-readable storage medium of claim 13, wherein the first value comprised in the second section is associated with a portion of the second section capable of holding a maximum of four bytes of data or eight bytes of data.

18. The non-transitory computer-readable storage medium of claim 13, wherein the first section further comprises a second number identifying a time duration between successive timestamps of the plurality of timestamps.

19. The non-transitory computer-readable storage medium of claim 13, wherein the values sequenced based on a plurality of timestamps comprise metric data generated from analysis of computer resources of an online service provider.

* * * * *